United States Patent
Fung-A-Wing et al.

(10) Patent No.: US 12,352,661 B2
(45) Date of Patent: *Jul. 8, 2025

(54) LEAK DETECTION AND CONTROL SYSTEM

(71) Applicant: Kairos Water, Inc., Atlanta, GA (US)

(72) Inventors: Dean Fung-A-Wing, Atlanta, GA (US); Seth Lawrence Taylor, Atlanta, GA (US)

(73) Assignee: Kairos Water, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,026

(22) Filed: Oct. 4, 2023

(65) Prior Publication Data
US 2024/0035918 A1 Feb. 1, 2024

Related U.S. Application Data

(63) Continuation of application No. 17/461,234, filed on Aug. 30, 2021, now Pat. No. 11,781,940, which is a (Continued)

(51) Int. Cl.
*G08B 21/00* (2006.01)
*G01F 1/66* (2022.01)
(Continued)

(52) U.S. Cl.
CPC ............... *G01M 3/40* (2013.01); *G01F 1/66* (2013.01); *G01K 13/02* (2013.01); *G05D 7/0635* (2013.01); *G08B 21/18* (2013.01); *G01K 13/026* (2021.01)

(58) Field of Classification Search
CPC . G01M 3/40; G01M 3/16; G01M 3/26; G01F 1/66; G01F 1/667; G01F 15/005;
(Continued)

(56) References Cited

U.S. PATENT DOCUMENTS

| | | |
|---|---|---|
| 4,052,896 A | 10/1977 | Lee et al. |
| 6,003,536 A | 12/1999 | Polverari et al. |

(Continued)

FOREIGN PATENT DOCUMENTS

| | | |
|---|---|---|
| CN | 102881142 A | 1/2013 |
| CN | 203688134 U | 7/2014 |

(Continued)

OTHER PUBLICATIONS

"Energy Harvesting from Fluid Flow in Water Pipelines for Smart Metering Applications", D Hoffman et al 2013 J. Phys.: Conf. Ser. 476 012104 (2013).

(Continued)

*Primary Examiner* — Mark S Rushing
(74) *Attorney, Agent, or Firm* — HILL, KERTSCHER & WHARTON, LLP; Gregory T. Ourada

(57) ABSTRACT

A leak detection and control system which encompasses a membrane leak sensor and a fluid control device adapted for installation on a fluid supply line, both capable of wireless data communication with a gateway acting as an interface between the leak sensor and fluid control unit and a cloud server or a remote user application.

10 Claims, 25 Drawing Sheets

Related U.S. Application Data continuation-in-part of application No. 16/983,670, filed on Aug. 3, 2020, now Pat. No. 11,262,271, which is a continuation of application No. 16/388,433, filed on Apr. 18, 2019, now Pat. No. 10,732,071.

(60) Provisional application No. 62/659,741, filed on Apr. 19, 2018.

(51) Int. Cl.
  *G01K 13/02* (2021.01)
  *G01M 3/40* (2006.01)
  *G05D 7/06* (2006.01)
  *G08B 21/18* (2006.01)

(58) Field of Classification Search
  CPC ........ G01K 13/02; G01K 13/026; G01K 7/22; G01K 7/42; G05D 7/0635; G08B 21/18; G08B 21/182
  USPC .......................................................... 340/605
  See application file for complete search history.

(56) References Cited

U.S. PATENT DOCUMENTS

| | | | |
|---|---|---|---|
| 6,484,564 B1 * | 11/2002 | Hayashida | G01M 3/38 73/40 |
| 6,639,517 B1 | 10/2003 | Chapman et al. | |
| 7,091,628 B1 | 8/2006 | Balt | |
| 8,539,827 B2 | 9/2013 | Benson et al. | |
| 8,636,407 B2 | 1/2014 | Woodard | |
| 9,574,923 B2 | 2/2017 | Williamson et al. | |
| 2008/0219831 A1 | 9/2008 | Yen | |
| 2010/0308591 A1 | 12/2010 | Godfrey | |
| 2015/0163412 A1 * | 6/2015 | Holley | G08B 25/008 348/143 |
| 2016/0163177 A1 * | 6/2016 | Klicpera | E03B 7/071 137/59 |
| 2018/0024023 A1 | 1/2018 | Yoshitomi et al. | |
| 2018/0166713 A1 | 6/2018 | Wakita et al. | |
| 2018/0328811 A1 | 11/2018 | Mielke et al. | |
| 2019/0040548 A1 * | 2/2019 | Aitchison | D06M 11/74 |

FOREIGN PATENT DOCUMENTS

| | | |
|---|---|---|
| EP | 0341934 A1 | 11/1989 |
| JP | 1163859 | 11/1989 |
| JP | 6308252 H | 4/1994 |
| JP | 06072038 | 10/1994 |
| JP | H06308252 A | 11/1994 |
| JP | 2005148975 A | 6/2005 |
| JP | 2011138399 A | 7/2011 |
| JP | 2014509733 A | 4/2014 |
| JP | 20141696919 A | 10/2014 |
| KR | 2017003752 A | 1/2017 |
| WO | 2012129101 A1 | 9/2012 |
| WO | 2016121952 A1 | 8/2016 |

OTHER PUBLICATIONS

"Grohe Sense Guard Water Security Kit-22602LN0" www.homedepot.com/p/GROHE-Sense-Guard-Water-Security-Kit-22602LN0/ . . . accessed Jan. 30, 2019.

* cited by examiner

LEAK DETECTION AND CONTROL SYSTEM

BACKGROUND

Persistent small leaks often go undetected in a home and can cause significant mold buildup and property damage because accessing various areas of the home where leaks are likely to occur is difficult due to the constraints of visibility and real time monitoring. An example of such an area is underneath a dishwasher where access is very limited and the space constraints make it difficult to install most if not all available market offerings for leak detection devices. Most leak detectors on the market are considered spot leak detectors and are limited in their ability to address consistent/intermittent small and slow leaks where the affected area is not widespread enough to have water come into contact with the leak sensors. Spot leak detectors also have form factor constraints due to the casings that house the onboard leak detection circuitry. Placement of these spot leak detection devices is a problem with appliances such as dishwashers, ice machines, and refrigeration products because it often requires arduous removal and installation. Some strip sensors utilize a form factor that must be placed around the perimeter of the suspected leak zone which can be ineffective if a leaking fluid has a path of least resistance other than the aforementioned perimeter contact strip setup. There are also leak sensing probes that take on a rope-like characteristic and can be placed underneath certain suspected leak sources but these sensing probes also lack the ability to detect small leaks that do not collect into larger pools of water.

Water meters have been on the market for a considerable period of time and vary in application for industrial, commercial, and residential use. Meters can vary also in the type of technology used to measure the flow of water. Some meters are connected to internal networks and others are connected to external networks for data analysis and system control. Most systems are managed using proprietary software and communication methods. These types of connected meters aren't affordable enough for consumers to implement and have typically been installed by water utility providers at the street where residential and commercial consumption data is controlled and billed by the utility provider. Standard utility meter consumption data is usually checked by a field service worker about once every 60 days, and then averaged to bill based off tiered rates. The standard utility meter is very reliable with a long service life and very low maintenance needs. However these meters can age and lose accuracy over time. They are sometimes calibrated but are rarely maintained for accuracy. Their internal components can deteriorate and in doing so contribute to water contamination. Most of these meters are not connected to publicly available networks for data analysis and end user control. Only 20% of street meters in the United States are considered network-connected meters. Most water utility providers have financial budget constraints that make the adoption of smart metering technology difficult and costly to implement.

Street meters often do not provide other valuable insight for the usage and real time conditions of the water supply like pressure and temperature. Most street meters also have a mechanical shut off valve built into the water supply line but can be difficult to shut off without the proper equipment. Pressure regulators located inside a building's structure are adjusted to control supply pressure from the water utility provider. Most pressure regulators are not remotely monitored or controlled, and therefore it is not known when failure is occurring or likely to occur. Failures like pipe bursts, water loss, and water leaks are not properly monitored or controlled by water utility providers making it costly for commercial and residential end users. The liability for water damage and loss remains the sole responsibility of the end user if the source of the damage or loss occurs in the water conduits between utility street meter and the dwelling. This cost can be overwhelming for homeowners, commercial property owners, and insurance companies.

Regarding water filtration, according to a World Health Organization/UNICEF report, some 2.1 billion people lack water at home that is free of bacterial contamination and is available when needed, that sets a baseline against which the world will measure progress toward the sustainable development goals for drinking water, sanitation, and hygiene. Most homeowners and commercially managed properties rely heavily on water filtration in addition to water treatment performed by the water utility treatment facilities. However, aging utilities infrastructure is making it difficult to control the quality of the water consumed by the end user.

BRIEF SUMMARY OF EMBODIMENTS PRESENTED

Sensing the quantity, timing, location, and quality of water flowing into a structure aids in determining when and where water losses, or intrusions, occur. A solution that considers these components to measure water efficiency has the potential to solve residential, commercial, and municipal concerns regarding the costly consequences of poor metering, inefficient infrastructure, or undetected water loss. The embodiments of the water control system embodiments described here incorporate an ultra-sonic water flow meter. In certain embodiments, data from this flow meter is transmitted via a low-power wireless transmitter to a gateway and hub assembly. In these embodiments, flow meter data is compressed for compatibility with a limited bandwidth signal. The flow pattern can be used to determine slow leaks, identify fixtures and appliances using water, and back flow scenarios. Local water intrusion is detected by leak sensor embodiments described herein for detecting leaks from both plumbed water sources (dishwashers, refrigerators, etc) and non-plumbed water sources (HVAC, condensing dryers, etc). Temperature and pressure sensors aid in measuring the quality of water flowing into a structure: freezing water can damage pipes and rising or falling pressure can be a sign of other issues. By adding water filtration, the solution is capable of detecting and removing harmful contaminants that not only negatively impact humans, but also cause damage to appliances that may result in leaks. Embodiments of the water control system incorporate a micro turbine which charges on-board batteries, allowing for autonomous operation without connection to an external power supply. Embodiments of the water control apparatus also incorporate a low-power wireless transmitter capable of transmitting and receiving flow data that is compressed for compatibility with a limited bandwidth signal.

A battery-operated long range wireless fluid control system is described herein comprising an ultrasonic flow meter, fluid pressure sensor, temperature sensor, a servo motor for automatic valve control, water quality and filtration analytics system, with an energy-harvesting electromagnetic hydro turbine for recharging the onboard low voltage battery bank. The control system also wirelessly monitors an array of fluid leak detectors with wireless mesh capabilities that can be used to locally and remotely monitor areas of potential and actual fluid leaks. Leaks can also be detected by the ultrasonic flow meter which is capable of monitoring extremely low amounts of fluid loss that do not necessarily result in a physical leak in the property but rather water loss through the fixtures like toilet bowls, faucets, and shower heads. The pressure sensor is intended to determine when there are physical changes in the pressure regulating valve as well as potential leaks for a property's exterior or interior water supply lines. The temperature probe is designed and integrated into the system to determine when freeze conditions are imminent so that automated and preprogrammed action can be taken to avoid pipe bursts inside the property by activating a hot water recirculating system, pipe heaters, or slow drip lines. The system is also comprised of a membrane leak detection sensor that uses a set of electrically-conductive strips arranged in a pattern on one side of a two-sided thin film nonabsorbent membrane that is used to detect the unwanted presence of fluids. Fluid detection triggers automatic response protocols to alert system users of a structural leak. The thin film adhesive membrane consists of strategically-placed perforations to allow liquids to travel from the nonconductive side of the membrane to the opposite side via natural fluid dynamics and capillary action with as little as 1 ml of liquid.

The electrical strips of the thin film membrane's conductive side are electrically connected to a leak sensing apparatus used to detect when electrical flow is received through the liquid conduit that closes and completes the normally open electrical circuit during a triggering event. This information is then processed by the water control system and various triggers and responses are initiated and signals are wirelessly and bidirectionally transmitted using various radio transmission protocols and streams to a gateway and cloud server which can then be translated into actionable data for the end user of the system. Trigger alerts can be audible and visible in nature onboard the physical sensor's input and output apparatus to alert localized users of the presence of liquid in the designated detection zone. There can also be liquid detection contacts natively onboard the input and output sensing apparatus in the form of electrical probe contacts to broaden the leak detection zone and detect leaks at the apparatus itself providing multiple leak detection zones separated by the electrical conduit between the leak sensor membrane and the input and output sensor apparatus. Fluid detection events are processed and transmitted to a network layer of the users' preferred smart building device and an application layer to then also alert remote system users of the location of the leak detection triggering event. The leak sensor may or may not have temperature and motion tamper detecting capabilities inside the sensor's housing. In addition to alerting an owner of the presence of the leak, detection of a leak can also result in a command being sent wirelessly to a valve actuator controlling flow of water to the location where the leak has been detected.

DETAILED DESCRIPTION OF THE PREFERRED EMBODIMENTS

Figure 1:
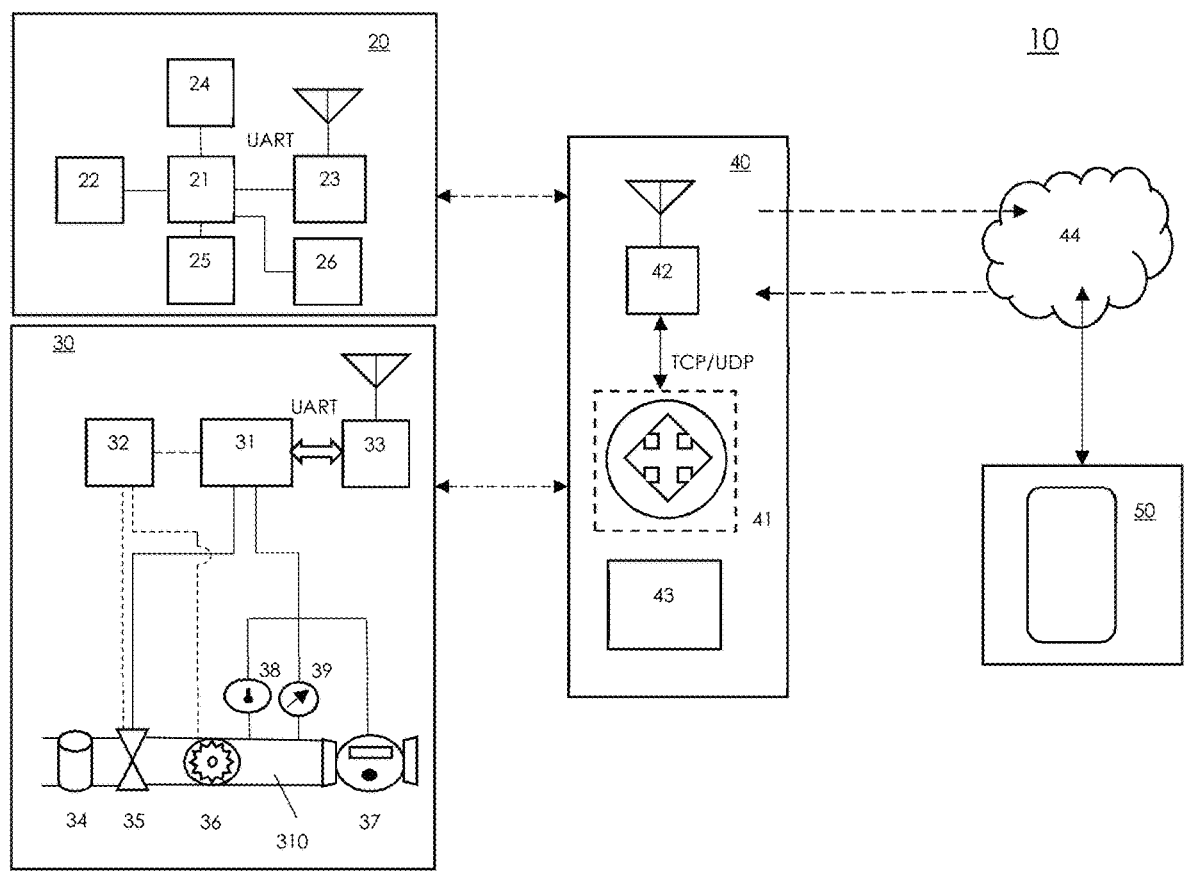
FIG. 1 is a functional block diagram of one embodiment of the overall water control system.

The present invention may be understood more readily by reference to the following detailed description taken in connection with the accompanying drawing figures, which form a part of this disclosure. It is to be understood that the claimed invention is not limited to the specific devices, methods, conditions, or parameters described or shown herein, and that the terminology used herein is for the purpose of describing particular embodiments by way of example only and is not intended to be limiting of the claimed invention.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Also, in the specification, including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

A functional block diagram of one embodiment of a water control system is presented in FIG. 1. This water control system embodiment 10 is comprised of a leak sensor 20, fluid control device 30, gateway 40, and remote user application 50.

Figure 1A:
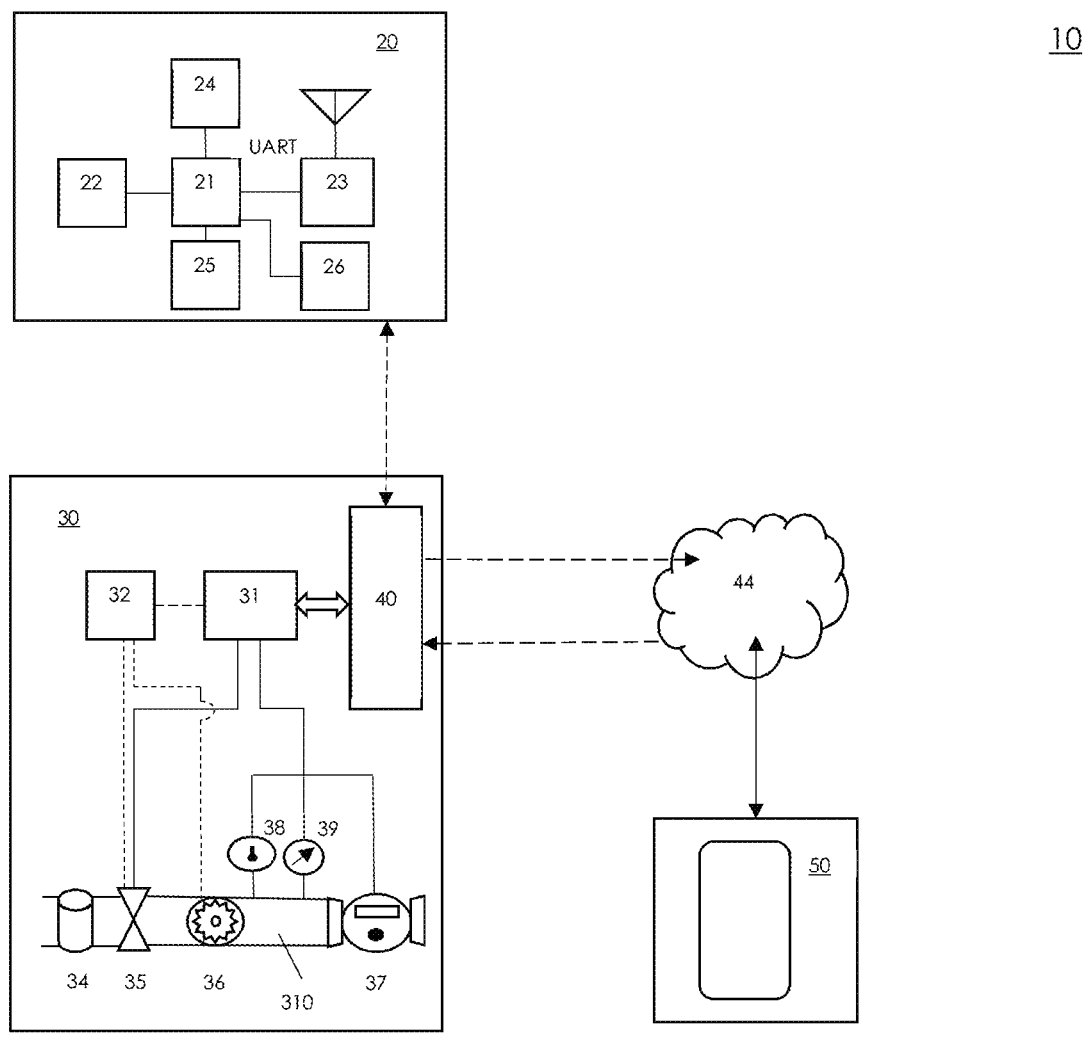
FIG. 1A is a functional block diagram of another embodiment of the overall water control system.

Leak sensor 20 in a preferred embodiment comprises a microcontroller 21, power supply 22, transceiver 23, membrane sensor 24, audible and visual alarm 25, and tilt switch 26. In certain embodiments, tilt switch 26 may be an accelerometer. Gateway 40 comprises a network server 41 electronically coupled to transceiver 42, and, in certain embodiments a battery backup 43. In certain embodiments, gateway 40 could also be a cellular modem. In single-family residential homes, a single-channel gateway may be preferred. Cloud server 44 links gateway 40 with remote user application 50, which provides the means for an end user to interact with the water control system, e.g. by sending commands, setting system preferences, etc. In certain cloud computing embodiments, cloud server 44 collects, processes, and analyzes data that is collected by leak sensor 20 and fluid control device 30. FIG. 1A shows an alternate embodiment of the water control system where gateway 40 is a component of the fluid control device 30. Transceivers 23, 33, and 42 in certain preferred embodiments are wireless transceivers with low power requirements, e.g. those employing the LoRa™, Bluetooth™ low energy (BLE), Zigbee™, or any other communications protocol known in the art. However, in other embodiments where size is not a consideration, larger, higher power transceivers, e.g. employing Wi-Fi protocol, may be used.

Figure 2:
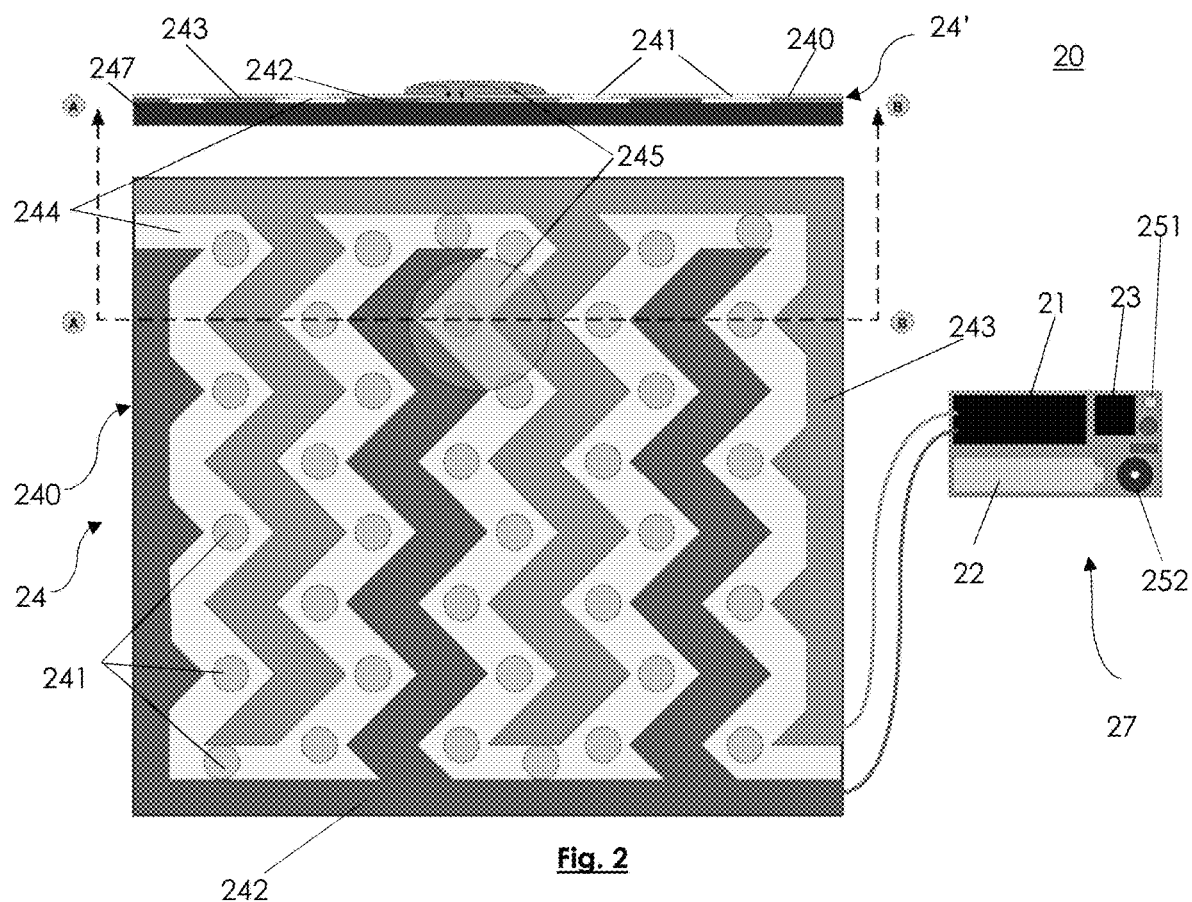
FIG. 2 shows a plan view of one embodiment of the membrane leak sensor.
Figure 3:
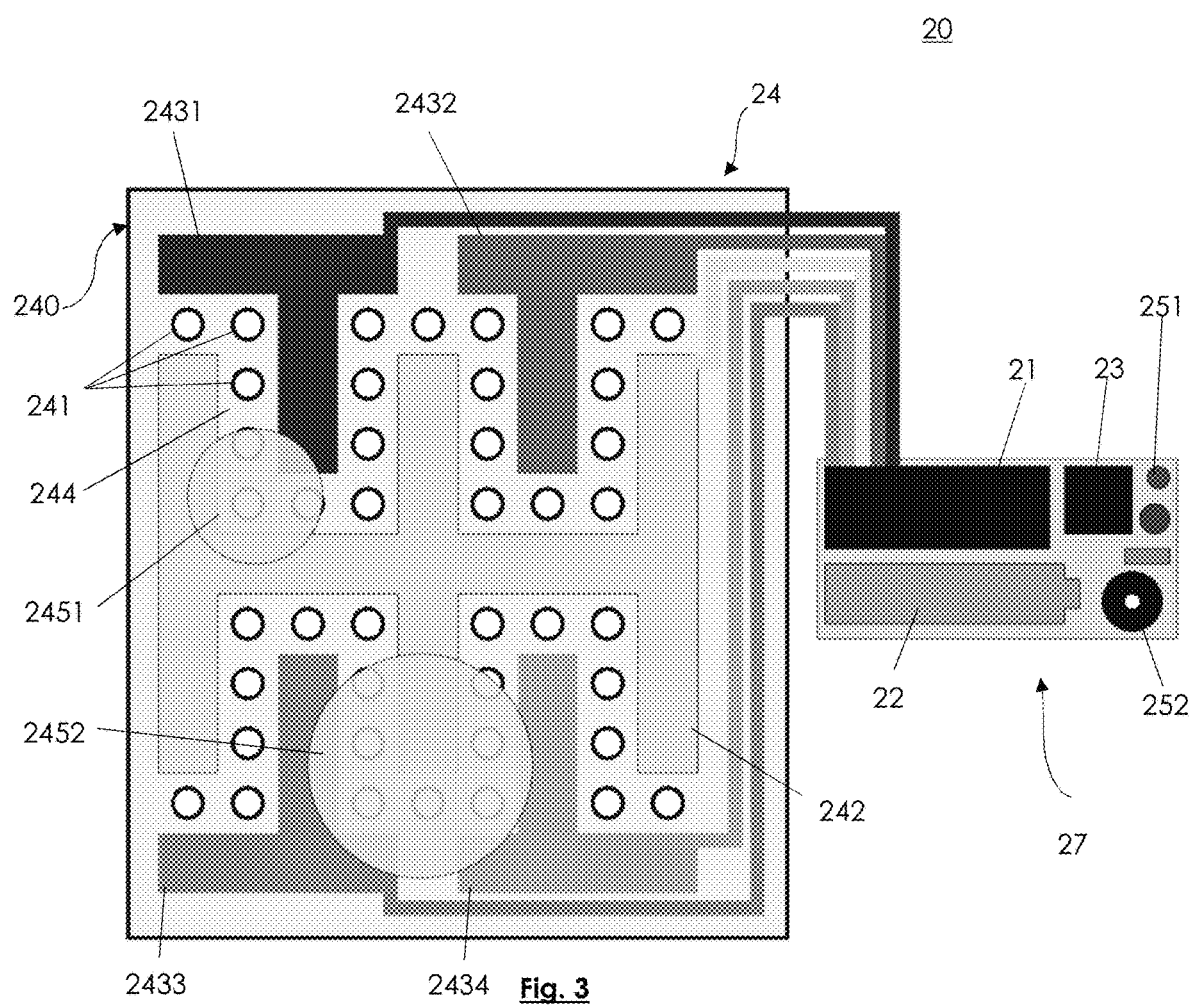
FIG. 3 shows an alternate embodiment of membrane leak sensor for determining leak size.

FIGS. 2-4 show different embodiments of membrane sensor 24. Membrane sensor 24 is capable of detecting both extremely small, consistent, or intermittent leaks, as well as large leaks in potential leak-prone areas such as restrooms, under counter cabinet areas with plumbing, roofing sublayers, subflooring, HVAC air handlers, water heaters, plumbing fixtures of all types, and appliances having a water line (e.g. refrigerators, dishwashers). FIGS. 2-4 illustrate certain embodiments of membrane sensor 24, which generally consist of a perforated thin film membrane with cathodes and anodes affixed in a planar array on one side with a gap between the cathodes and anodes. The perforations in the membrane allow liquids to pass through fluid dynamics and capillary action from the nonconductive side of the membrane to the side on which the cathodes and anodes are affixed. The cathode-anode patterns are arranged so that when fluid from a leak passes through the perforations the fluid bridges the gap between the anode and cathode, thereby closing the electrical circuit. Closing the electrical circuit triggers an alarm signal that is transmitted to microcontroller 21 using any of a variety of serial or parallel communications protocols, e.g. I2C, RS485, RS232, 1-Wire, SPI, or ADC. The alarm signal is transmitted from microcontroller 21 to activate an audible (e.g. buzzer) and visual (e.g. LED light) alarm 25. Tilt switch 26 is also incorporated into the leak sensor which sends a signal to microcontroller 21 which in turn triggers an audible and visual alarm 25 if the leak sensor is deliberately or inadvertently moved after the tilt switch has been armed. The alarm signal is also electronically transmitted to transceiver 23, which wirelessly transmits the alarm signal using an appropriate wireless transmission protocol to gateway 40. Gateway 40 then relays the alarm signal to fluid control device 30, and, depending on how gateway 40 is configured and network connectivity, to a remote user application 50 via the Internet. Thus, in certain embodiments, once membrane sensor 24 detects a leak, leak sensor 20 generates an alarm signal that is transmitted to both local and remote end users.

FIG. 2 shows a detailed plan view of one embodiment of leak sensor 20 featuring membrane sensor 24, along with a cross sectional view 24' taken along line A-B of same. Membrane sensor 24 is comprised of a thin membrane 240 made of plastic, vinyl or other suitable high-resistance (i.e. non-conductive) material. Anode 242 and cathode 243 are made of suitable conductive material that is adhered to one side of membrane 240 such that they are laterally separated by a gap 244. The geometry of the anode and cathode arrangement, including the size of the gap between the two, determine the sensitivity of membrane sensor 24 to leaks. Additionally, membrane 240 has numerous perforations 241 superimposed upon gap 244. When in use, membrane sensor is placed on an underlying surface (e.g. floor) 247, with the anode 242 and cathode 243 in contact with the floor, i.e. between the floor and membrane 240. In this way, if leak 245 occurs, the liquid will be drawn through the perforations by capillary action into the gap 244, thereby closing the circuit. Anode 242 and cathode 243 are part of an electrical circuit connected to microcontroller 21. Closing the circuit causes an electrical signal to be detected in microcontroller 21, which triggers visual alarm 251 and audible alarm 252. Microcontroller 21 then generates an alarm message that is transmitted wirelessly through transceiver 23. In one alternate embodiment, microcontroller 21, power supply 22, transceiver 23, visual alarm 251, and audible alarm 252 are encased in a waterproof housing that is designed to float for added reliability. A housing capable of floating is beneficial because immersion in water is likely to block radio signal transmission, inhibiting alarm signals from being sent. Another embodiment of leak sensor 20 features an ultrasonic sensor incorporated into the waterproof housing that is capable of measuring the level of fluid resulting from a leak.

Figure 3A:
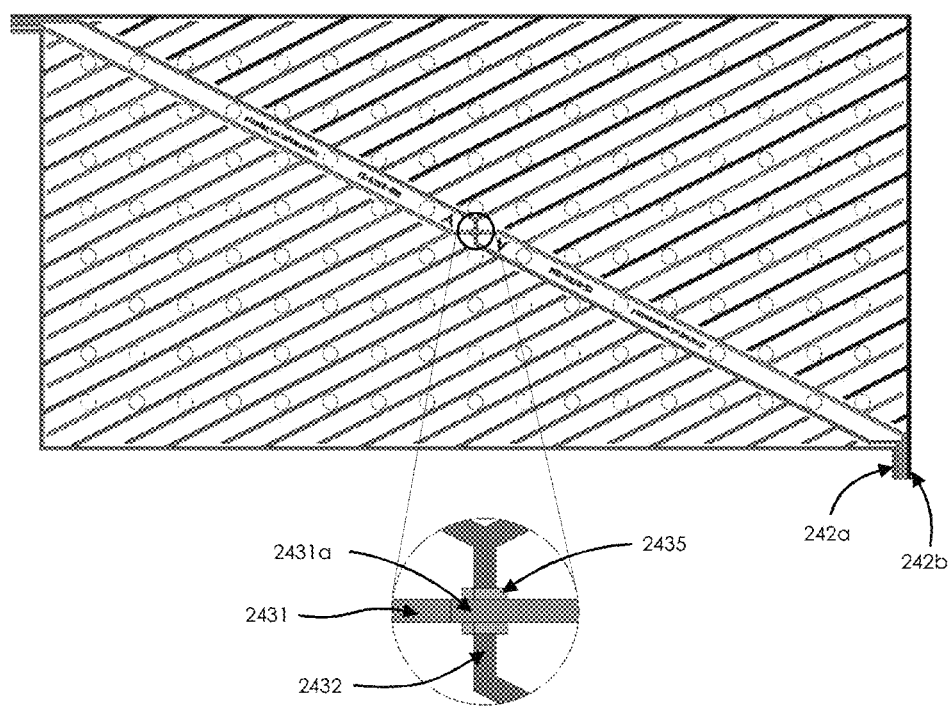
FIG. 3A shows an alternate embodiment of membrane leak sensor for determining leak size using 4-wire connector.

FIG. 3 shows an alternate embodiment of leak sensor 20 featuring membrane sensor 24 in the form of multiple cathodes for detecting leaks in different areas. Cathodes 2431, 2432, 2433, 2434 represent separate signal regions for the upper-left, upper-right, lower-left, and lower-right regions of the membrane sensor 24, respectively. Leak severity can be determined by the number of regions triggered. It should be noted that this is only one embodiment and other implementations could be imagined; such as, adding more cathodes to include more regions and in different configurations. The small leak 2451 only bridges cathode 2431 and anode 242 signaling at leak in the upper-left area of the mat; whereas the larger leak 2452 bridges cathodes 2433 and 2434 with anode 242, signaling a leak that spans the lower-left and lower-right of the mat. FIG. 3A illustrates an alternate embodiment of the membrane leak sensor capable of sensing four regions of the membrane using two cathodes (2431, 2432) and two anodes (242a and 242b). To permit the cathodes in this embodiment to cross over one another without touching, a dialectric ink patch 2435 is printed over cathode 2432 and another layer of conductive ink 2431a is printed over patch 2435 to connect the two halves of cathode 2431.

Figure 4A:
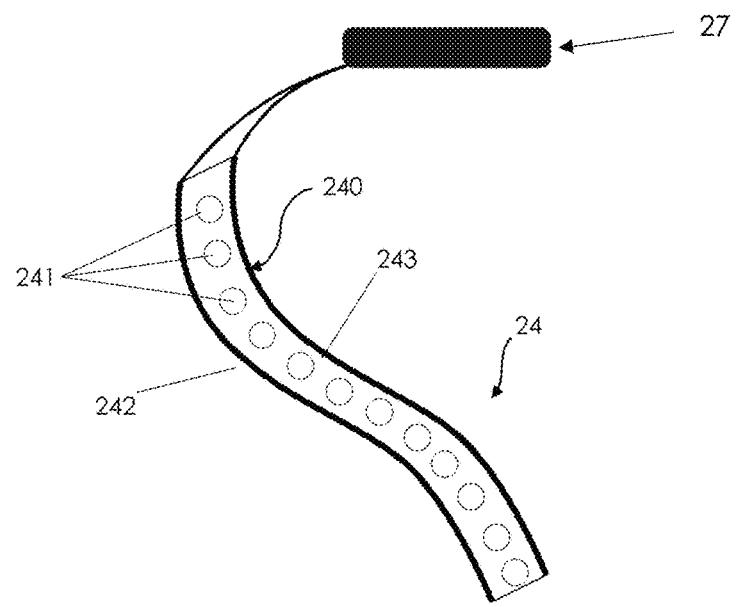
FIG. 4A shows an alternate embodiment of a membrane leak sensor in a flexible ribbon configuration.
Figure 4B:
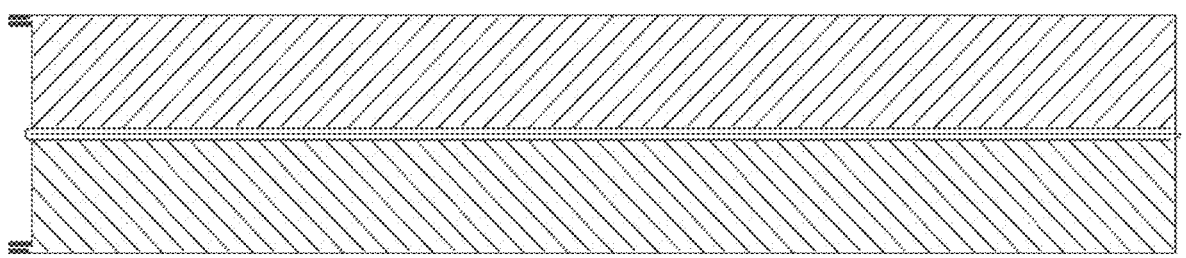
FIG. 4B shows an alternate embodiment of a membrane leak sensor.
Figure 4C:
FIG. 4C shows an alternate embodiment of a membrane leak sensor.
Figure 10:
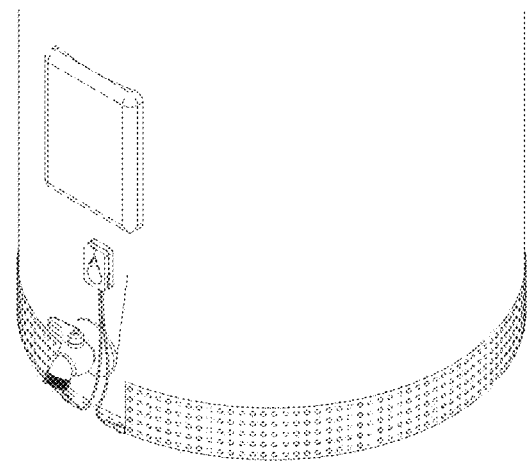
FIG. 10 illustrates one embodiment of the membrane leak sensor applied to a water heater.
Figure 11:
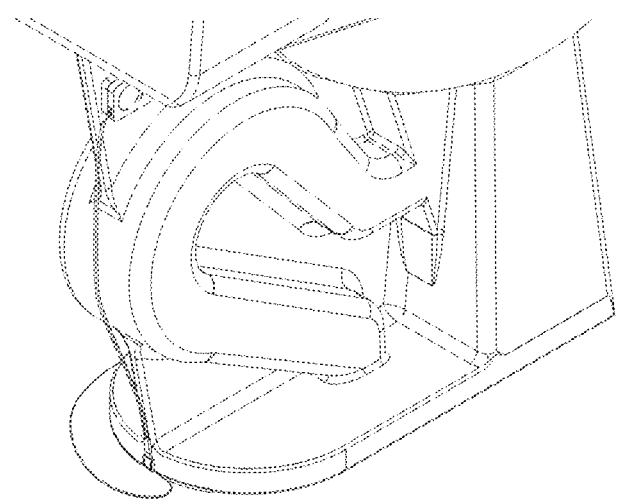
FIG. 11 illustrates one embodiment of the membrane leak sensor applied to the base of a toilet.

While FIGS. 2 and 3 show mat-type embodiments of membrane sensor 24, FIG. 4A shows an alternate embodiment of membrane sensor 24 in the form of a strip, i.e. a strip-type membrane sensor. In the FIG. 4A embodiment, it will be appreciated that this embodiment provides a great deal of installation flexibility, as the membrane sensor can be manufactured in roll format and an adhesive layer can be applied to allow the strip to be applied to surfaces where it may not stay in place. This embodiment also features membrane 240 having perforations 241 allowing water to pass through and contact anode 242 and cathode 243, thereby closing the circuit and causing a signal to be generated at microcontroller 21. In both the mat-type and ribbon-type embodiments, membrane sensor 24 is installed so that the planar anode-cathode array is in contact with the underlying surface. FIG. 4B shows an alternate embodiment for the membrane leak sensor suitable for use with packaged terminal air conditioning (PTAC) units, as well as water heaters, in which the membrane leak sensor is installed vertically. In the embodiments illustrated in FIG. 4B, fluid will flow across the sensor top-to-bottom, so the sensor array is designed to maximize the probability of the gap between anode and cathode being bridged by the fluid. The FIG. 4B embodiments are installed underneath and lying flat under a PTAC unit or cut in half along the horizontal line in the middle of the design and wrapped around the base of a water heater with the halves being connected using a separate connector as shown in FIG. 10. Finally, FIG. 4C illustrates an embodiment of the leak sensor for use in detecting toilet leaks. In the FIG. 4C embodiment, each lead wraps around the base of a toilet as shown in FIG. 11. For the leak sensor embodiments designed for use under dishwashers, refrigerators, and other appliances, the leak sensor typically will be manufactured in 20 in by 20 in, 30 in-by-20 in, or 9 in-by-18 in sizes as dictated by the particular application. In contrast to other membrane sensors disclosed in the prior art in which the membrane is in contact with the underlying surface, the current embodiments protect the planar anode-cathode array from dirt and debris that can short the circuit and cause false alarm signals.

In preferred embodiments, microcontroller 21, power supply 22, transceiver, 23, visual alarm 251, and audible alarm are located in leak sensor module 27. Certain embodiments of leak sensor module are waterproof, and in some cases, the housing encompassing the module can be designed to float. In these embodiments, it is envisioned that an ultrasonic sensor can be incorporated into the leak sensor module for the purpose of determining the fluid level in the event of a leak. In this case, it is important to ensure that the housing encompassing the leak sensor module is hydrostatically balanced to that the ultrasonic sensor aligns properly relative to the base surface. In another embodiment of the leak sensors illustrated in FIGS. 2-4, microcontroller 21 transceiver 23, power supply 22, visual alarm 251, and audible alarm 252 are integrated/embedded into the membrane itself.

Microcontroller 21 is designed with a physical analog or digital interface which allows a sensor other than membrane sensor 24, to be attached. In the embodiments featuring a leak sensor module 27, the module housing the microprocessor can be used with a wide variety of sensors, e.g. humidity, dust, particulates, volatile organic compounds, carbon monoxide, etc. In these embodiments, leak sensor module 27 can be viewed as a sensor node for transmitting a wide variety of sensor information to a gateway. These embodiments expand the applications of the leak sensor module to a wide variety of applications. For example, a moisture sensor connected to leak sensor module 27 can be used in horticultural applications, where the fluid control device 30 can serve as an irrigation controller.

FIG. 1 shows a functional block diagram of one embodiment of fluid control device 30, which comprises microcontroller 31, power supply 32, transceiver 33, water filter 34, valve and actuator assembly 35, microturbine generator 36, ultrasonic flow sensor 37, temperature sensor 38, pressure sensor 39, and piping segment 310. Once a leak is detected by leak sensor 20, it transmits an alarm signal to gateway 40, which relays this alarm to transceiver 33 of fluid control device 30. Microcontroller 31 receives signals from transceiver 33 and is coupled electronically to valve and actuator assembly 35, temperature sensor 38, pressure sensor 39, and ultrasonic flow sensor 37. Power supply 32 supplies electrical power for the entire fluid control device 30, including valve and actuator assembly 35. Power supply 32 in one embodiment consists of a rechargeable battery bank. The rechargeable battery bank is recharged by microturbine generator 36, which is electrically connected to the battery bank. This allows fluid control device 30 to operate independently without external power to the unit. Temperature sensor 38 is used to collect real-time temperature data and monitor the temperature of the incoming water to determine if conditions are conducive to pipe freezing. Pressure sensor 39 measures water supply pressure and sends real-time water pressure data to microcontroller 31. In the alternate embodiment shown in FIG. 1A, gateway 40 is contained within fluid control device 30.

Figure 5:
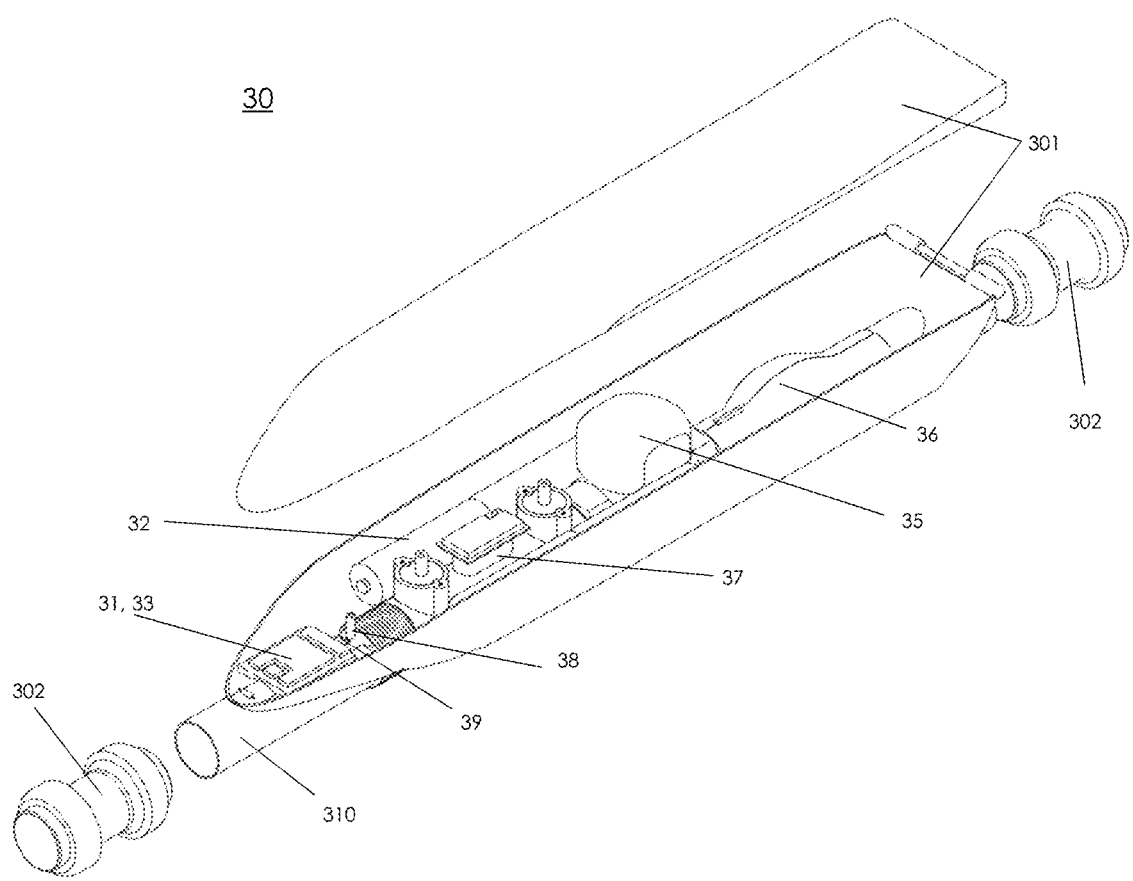
FIG. 5 is an exploded isometric view of one embodiment of the fluid control device.

FIG. 5 is an isometric view of exemplary embodiment of fluid control device 30. Fluid control device 30 is designed for installation on the water pipe supplying water to a building or residence. To install fluid control device 30, a segment of the water supply line is removed, and the fluid control device is installed in its place. Adapters 302 join the existing water supply line with fluid control device's piping segment 310. Power supply 32 is a rechargeable battery bank that is charged using electrical energy generated by microturbine generator 36. In this embodiment of fluid control device 30, microcontroller 31 is combined with a low power transceiver 33 (e.g. using LoRa™ communications standard). Valve and actuator assembly 35, ultrasonic flow sensor 37, temperature sensor 38 and pressure sensor 39 are all mounted on piping segment 310. The valve and actuator assembly 35 in at least one embodiment consists of an electrical motor connected to power supply 32. This motor actuates a valve that is mounted directly on the piping segment 310. The valve is most embodiments is either a ball or gate valve and permits flow of water through piping segment 310 to be throttled or shut off entirely. All of the foregoing components are contained within a housing 301 that is typically of injection-molded plastic, fiberglass, or other suitable material. Ultrasonic flow sensor 37 gives the user (e.g. maintenance crews, building engineers and home owners) the capability of independently evaluating accuracy of a municipal water meter. It also permits data collection by the user, detection of large and extremely small water loss conditions, and also permits fingerprinting of individual water fixtures inside a structure, to detect which feature is being used at any time. Data collected from ultrasonic flow sensor 37 provides users reactive, preventative, and predictive recommendations.

As discussed in more detail below, sensor data from the temperature, pressure, and ultrasonic flow sensor is collected by the fluid control device and periodically transmitted to the remote user application 50 via transceiver 33 and gateway 40. Remote user application 50 may perform calculations on the temperature, pressure, and flow data, and statistically analyzes this data, or this can be performed by cloud server 44. One embodiment of such processing is represented by the flowchart shown in FIG. 7A-7H. In one embodiment, if a drop in pressure exceeding a certain threshold is detected by pressure sensor 39 that indicates a burst pipe condition, microcontroller 31 sends a signal to valve and actuator assembly 35 to shut off the incoming water to prevent a catastrophic, uncontrolled water leak. Remote user application also analyzes the characteristics of more subtle pressure drops, including their duration, magnitude, and can in this way fingerprint the water consumption signature of certain appliances and household plumbing fixtures.

LoRa™ refers to the low-power radio protocol developed by the LoRa Alliance for key stakeholders in the realm of IoT device communications. It is designed to provide a low-power transceiver solution for devices connecting to the Internet-of-Things. The protocol facilitates scalable solutions with secure bi-directional communication between network servers and end-point devices via a LoRa gateway. Gateways are connected to the network server using standard IP connections. End-devices utilize wireless communication to one or many gateways and all end-point communication can be bi-directional, but also supports operation such as multicast enabling software upgrade over the air or other mass distribution messages to reduce the on air communication time.

Bandwidth is limited in low-power wireless applications such as LoRa. As a result embodiments of leak sensor 20 and fluid control device 30 employing the LoRa data protocol transmit data in payloads that are no greater than 11 bytes in size. In these embodiments, the first byte of each transmission is a header that identifies whether the following ten bytes should be interpreted as one of 17 fluid control device uplink, 5 fluid control device downlink, 7 leak sensor uplink, or 6 leak sensor downlink categories. These categories can be a combination of the various encoding methods in order to get the essential data from the sensor to the cloud server 44. Examples of the categories include: normal and abnormal sensor readings (normal, high, and long flow, pressure and temperature patterns, leak alarms, vital checks, tamper alarms, etc.). The encoded data may be categorized with the following interpretations: datetime (explicit), datetime (implicit), sensor with constant step, sensor with variable step, sensor digit representation.

Uplink Messages

Uplink messages are payloads sent via radio transmission from either leak sensor 20 or fluid control device 30 to the gateway 40 and forwarded to the MQTT broker in the cloud. Date and time are shared during all of these transmissions in various ways depending on the type of uplink. Accurate timestamps are required because messages can be collected either at the gateway 40, or locally at the leak sensor 20 or fluid control device 30 and shared at a later time. Reading the time receipts for messages transmitted to the cloud server 44 by leak sensor 20 or fluid control device 30 via gateway 40 after an outage could lead to inaccurate timestamps and trigger false alarms in the leak detection logic subroutine described below. Timestamps can be characterized as either explicit or implicit. Explicit refers to timestamps that are reported as year & month, day, hour, minute, and second. Each value is reported as accurately as it was read by the device sending the timestamp. Note only one byte is dedicated to both year and month since 256 bits can represent 21 years of operation. Implicit refers to timestamps that are reported as year & month, day, and hour or else only a single byte that represents six-minute intervals throughout a 24-hour day. In the case of implicit timestamps, the actual date and time must be corroborated with the gateway to infer other time components. Implicit values are used for flow event payloads in order to ensure there are enough bytes available to transmit the complete flow and pressure profile. Daily averages of temperature and pressure measurements are shared on a twelve-hour basis by leak sensor 20 and fluid control device 30 via the gateway 40. Because of this, the accuracy only needs to be at the twelve-hour interval and is thus an implicit timestamp. The minimum (0) and maximum (255) bit values are reserved for overflow, or out-of-range, readings. Encoded values of 0 are interpreted as less than the minimum encodable value, which is determined by the 2nd bit's decoded value. Encoded values of 255 are interpreted as greater than the maximum encodable value, which is determined by the 254th bit's decoded value. The range of maximum and minimum values to be encoded for a particular sensor were based on a balance between the range of interesting values and the optimum resolution required for creating a meaningful analysis of the sensor data.

Two approaches are used to encode sensor readings based on the variety of sensor information needed and the resolution required for accurate analysis. These approaches are single-byte and multiple-byte encoding. Single-byte encoding is the simplest method and allows a payload to carry up to 10 sensors (the first byte is always a header). Two variations of single-byte encoding are: constant and variable step. Constant-step refers to the encoded values being spaced evenly apart by constant steps. This variation of single-byte encoding works best when the sensor's range of applicable readings and resolution fit within 256 bits. The variable step method creates a non-uniform step size between decoded values. This method allows for a single sensor to be represented by only one byte, thus freeing up other bytes for other sensor data. In order to do so, resolution is sacrificed at the minimum and maximum readings. The flow rate statistical summaries used in analyzing flow characteristics after a flow event are an example of the described system using this method. A single transmission after a flow event must send a header (one byte), implicit timestamp (one byte), duration (two bytes), the average/standard deviation/ maximum flow rates (three bytes), and the average/standard deviation/maximum/minimum pressures (four bytes). The flow rate maximum, standard deviation, and average cover a wide range of values (−1 to 32 gpm) at very low resolution (0.0044 gpm). The leak detection system requires the highest resolution and accuracy as the readings approach zero and accuracy can be sacrificed as the flow rate approaches the extreme values. Flow in the opposite direction from normal is rare and unexpected but could indicate real issues with plumbing at the street; thus, it is captured, but the resolution is not of primary concern. The following model was developed to represent the average, maximum, and standard deviation for flow rates and encoded to 256 bits.

$$i = \text{bits from 0 to 255,}$$

$$q = \text{flow rate in } gpm,$$

$$q_{res} = \text{resolution of flow sensor } i_0 = 11(\text{zero reference}),$$

$$q_{res} = 0.0044 \ gpm,$$

$$C = 1.020813211 \ q_i = \text{integer}\left(\frac{q_{i-1} + q_{res}C^{(i-i_0)}}{q_{res}}\right)q_{res}$$

Figure 9:
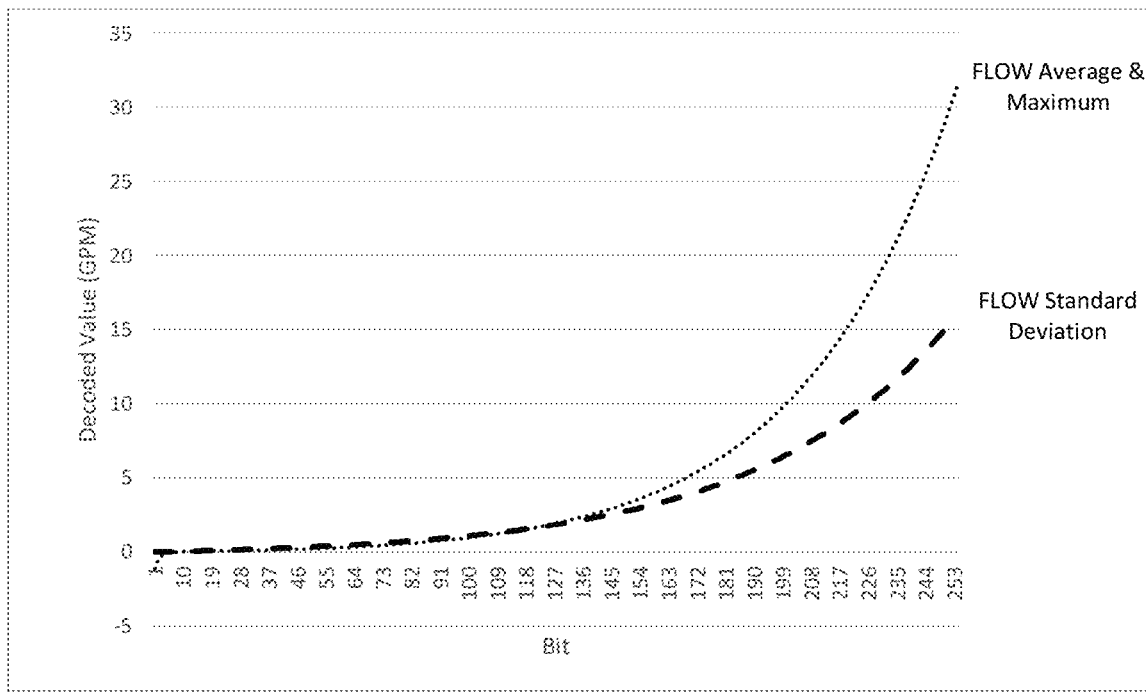
FIG. 9 is a chart showing the calculated relationship between encoded data bits and decoded values.

The resulting encoded bits (x) and decoded values (y) are represented by the exponential curve shown in FIG. 9.

The most accurate representation of the sensor readings can be accomplished by this type of encoding since it encodes separate bytes for pairs of digits in the actual sensor reading; for example, a flow rate of 125.3241 gallons per minute can be represented as:

1$^{st}$ byte encodes the hundreds and tens as 12 (120 gpm)

2$^{nd}$ byte encodes the ones and tenths as 53 (5.3 gpm)

3$^{rd}$ byte encode the hundredth and thousandths as 24 (0.024 gpm)

4$^{th}$ byte encodes the ten-thousandths as 1 (0.0001 gpm)

The highest accuracy is needed when:

the user specifically requests the current flow rate the system performs a pressure check and reports the pressure loss the system notices a flow or pressure anomaly and it reports the instantaneous flow and/or pressure Duration of flow always requires two bytes for this water sensing application because one second resolution is required and time events can last several hours.

Downlink Messages

Downlink messages are payloads sent from the cloud to gateway 40 and wirelessly forwarded to the leak sensor 20 and fluid control device 30. These payloads contain data in the form of on-device settings updates, requests for immediate uplink with specific sensor data, or specific hardware action commands, such as closing the water control device shut-off valve. Settings are device-specific variables that control, e.g. the frequency of check-in with the cloud, tolerances for activating an alert, date and time keeping updates, and automatic behavior settings. Payloads can be sent to a device instructing it to immediately uplink with information for all, or only some sensors. Downlink can contain payloads that tell a system to activate a hardware component. In the embodiments described herein, one example command is to tell the water control system to stop, start, or throttle water flow.

Gateway 40 in typical embodiments relays data transmitted via low-power transceiver link from leak sensor 20 and fluid control device 30 via network server 41 and an Internet connection to a remote user application 50. That is, gateway 40 in these typical embodiments is analogous to a Wi-Fi router which links leak sensors 20 and fluid control devices 30 having short-range, low-power transceivers and the remote user application 50 via the Internet. It receives information via transceiver 42 from leak sensor 20 and fluid control device 30 typically via low-power wireless broadcast. In typical embodiments, gateway 40 comprises a network server 41, which receives, updates, and stores user preferences that are set using remote user application 50. In certain embodiments, gateway 40 also has an battery backup 43, typically a rechargeable battery that can supply power and enable the system to continue functioning for a period of time if mains power to a structure is lost. In one embodiment, this rechargeable battery could be a four-cell battery pack using Tadiran TL-5104/S 3.6V Lithium AA Batteries with 2.1 Ah capacity (i.e. total capacity of the cells in parallel would be 8.4 Ah)

Cloud server 44 in the embodiments shown in FIGS. 1 and 1A comprises a server and a database and collects, processes, and analyzes data collected by leak sensor 20 and fluid control device 30. In particular, it may analyze sensor data and can develop water usage signatures of particular appliances and fixtures within a building. It also stores configuration data and relays commands from remote user application 50 to leak sensor 20 and fluid control device 30 via gateway 40.

Remote user application 50 is a software application that provides the primary end user interface with the water control system. In typical embodiments processes data from sensors and processes it for analysis and visualization and allows the user to configure system settings and issue system commands (e.g. shut water valve). Thus, for example, a user who receives an alert regarding a water leak can send a signal from their mobile device to close the water shut-off valve.

Figure 6A:
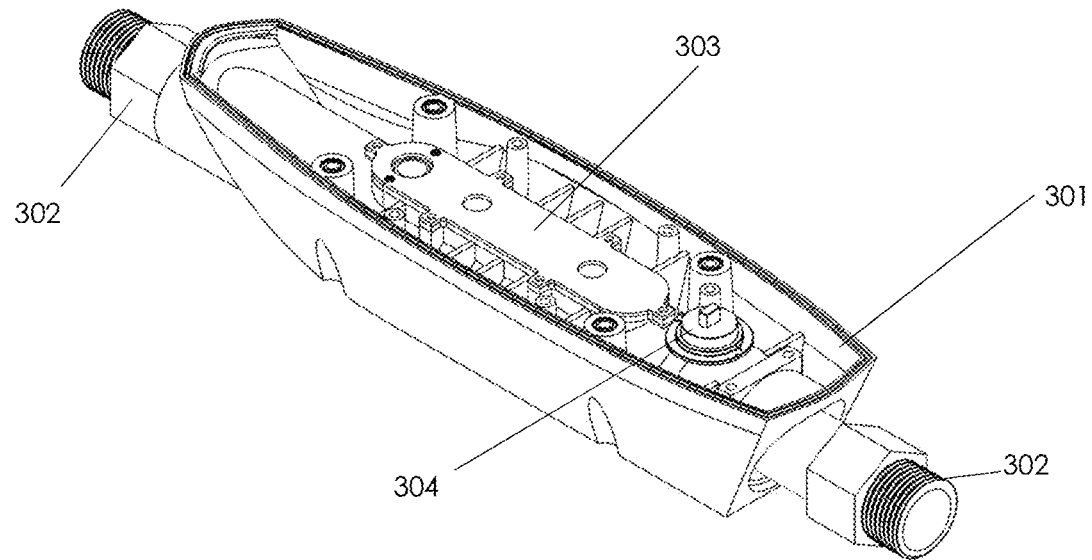
FIG. 6A shows an alternate embodiment of the fluid control device.
Figure 6B:
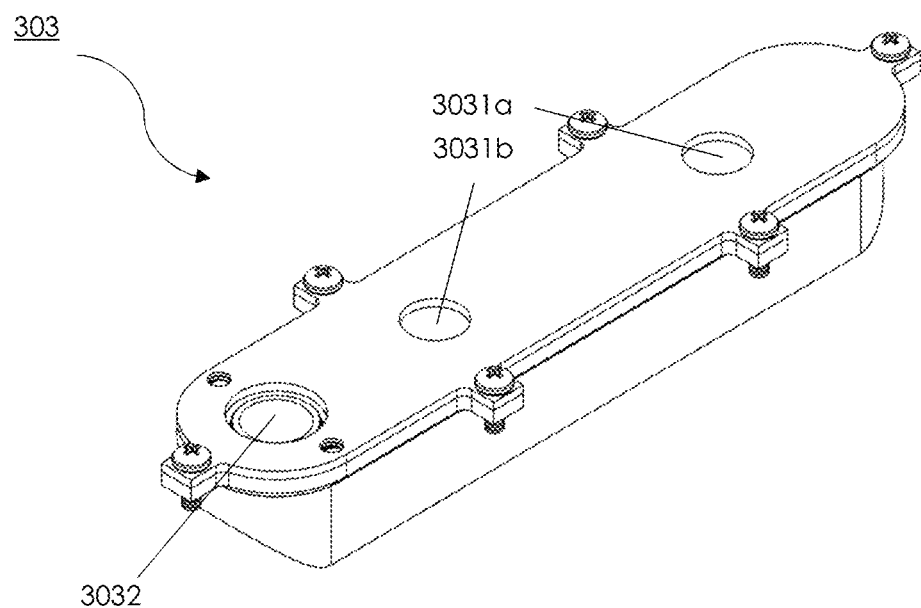
FIG. 6B illustrates the removable sensor assembly in an alternate embodiment of the fluid control device.
Figure 6C:
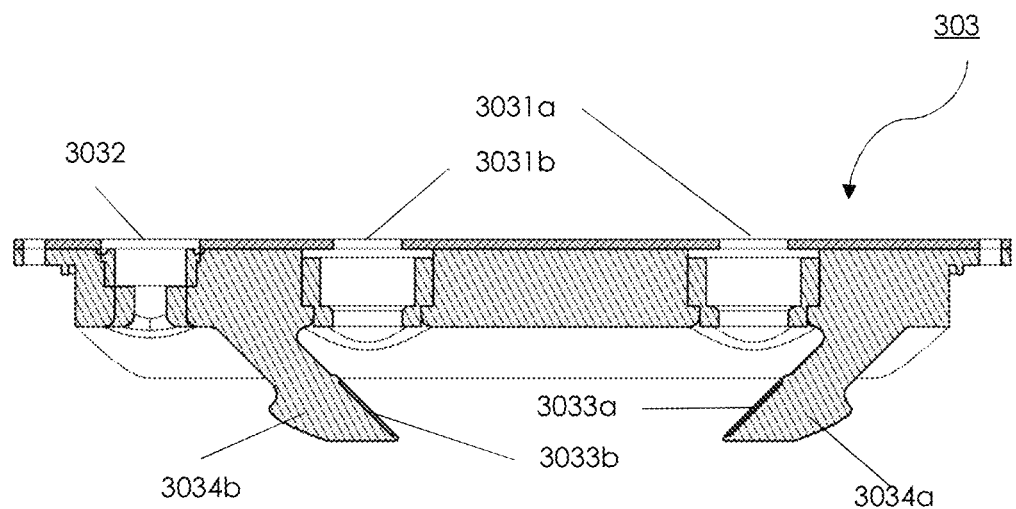
FIG. 6C is a lateral, cross-sectional view of the removable sensor assembly.
Figure 6D:
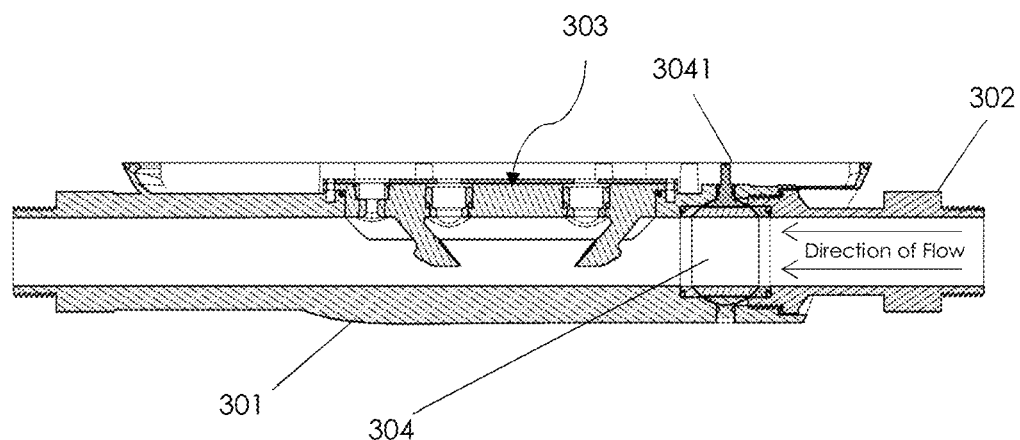
FIG. 6D is a lateral, cross-sectional view of the fluid control device in an alternate embodiment.
Figure 6E:
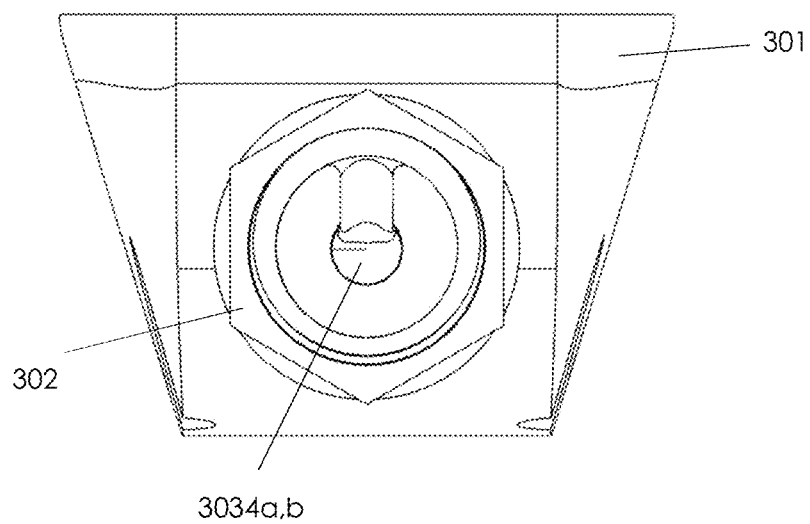
FIG. 6E is an axial view of the fluid control device.
Figure 6F:
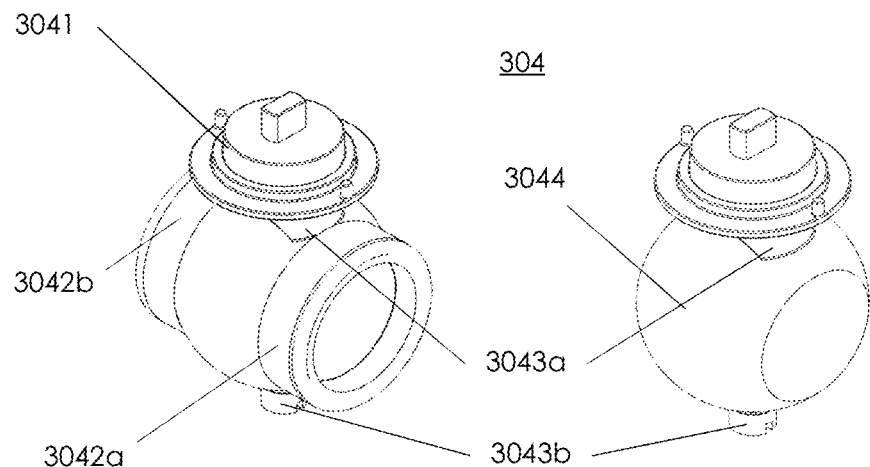
FIG. 6F is an illustration of the ball valve assembly.

FIGS. 6A-6H illustrate an alternative embodiment of the fluid control device, which features a removable sensor assembly 303. The removable sensor assembly 303 facilitates cleaning, repair, and upgrade of the ultrasonic flow sensor and other sensors (e.g. pressure, temperature). It also facilitates manufacturing efficiency, since it allows housing 301 to be interchangeable with a variety of sensor assemblies 303. Use of a removable sensor assembly as disclosed in this embodiment also reduces head loss across the reflectoscope, i.e. the portion of the piping segment in which ultrasonic emissions are used to detect flow rate. Removable sensor assemblies 303 can be tailored for different applications. For example, one sensor assembly could be tailored for use on residential water pipes, another sensor assembly could be used for industrial fluid control applications such as chemical plants and refineries. Thus, while the removable sensor assembly 303 shown in FIGS. 6A-6H are applicable to commercial and residential water supply applications, their use is not restricted to these applications. FIG. 6B is an isometric view of an embodiment of removable sensor assembly 303 showing ultrasonic transducers 3031a and 3031b. Also, shown is a pressure sensor port 3032, into which the flow tube pressure sensor is installed. FIG. 6C is a lateral, cross-sectional view of the removable sensor assembly 303, additionally showing ultrasonic transducer reflectors 3033a, 3033b, which are installed in hydrodynamic fairings 3034a, 3034b. As shown in FIG. 6E, which is a view along the flow axis, hydrodynamic fairings 3034a, 3034b are designed to reduce flow losses, as well as reduce turbulence between the flow sensor mirrors. Pressure signals from one of the ultrasonic transducers 3031a, 3031b are redirected 90 degrees by ultrasonic transducer reflectors 3033a, 3033b, and received by the other ultrasonic transducer. Analysis of this signal allows fluid flow rate in the flow tube to be calculated.

Figure 6G:
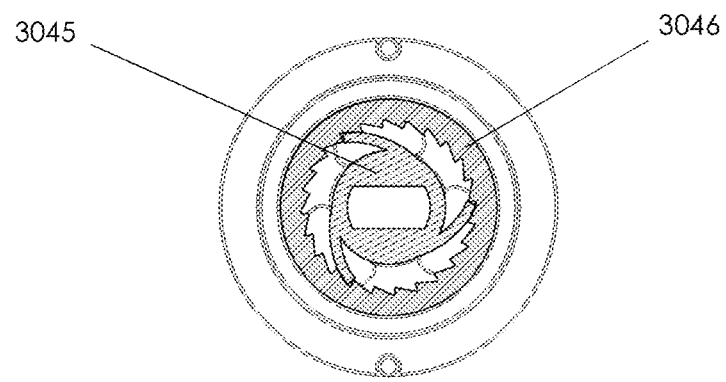
FIG. 6G is an illustration of the ratcheting valve stem of the ball valve assembly.

Referring now to FIGS. 6A and 6D, this embodiment also features a ball valve assembly 304 capable of being actuated by either a motor or manually. A ball valve is ideal in water supply pipe applications, as well as other fluids, including fluids with suspended non-abrasive solids, due to its excellent sealing characteristics. In one embodiment, ball valve assembly 304 is installed upstream of the removable sensor assembly 303 to allow the measurement of pressure within the structure when the ball valve is closed. The ball valve assembly 304 is shown in detail in FIG. 6F. The ball valve 3044 itself is actuated by a motor via the ratcheting valve stem 3041, which is connected to the ball valve top key 3043a which fits inside a groove carved into the ball valve 3044. Ball valve 3044 can also be manually actuated using the bottom key 3043b using a flat head screwdriver. Ball valve top key 3043a has a ratcheting mechanism attached. FIG. 6G illustrates the ratcheting mechanism for the ratcheting valve stem 3041, which consists of rotary ratchet pawl 3045 and rotary ratchet gear 3046. These allow ball valve 3044 to rotate freely in one direction when driven by the motor coupled to ball valve top key 3043a, while the bottom key allows the ball to be manually rotated in the opposite direction of the motor and without the high resistance of the highly-geared motor.

Figure 6H:
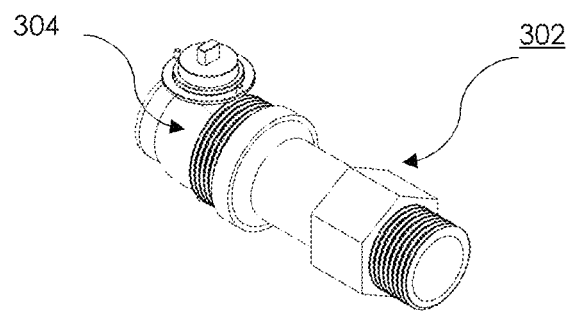
FIG. 6H is an illustration of the adapter coupled to the ball valve assembly in an alternate embodiment.
Figure 7A:
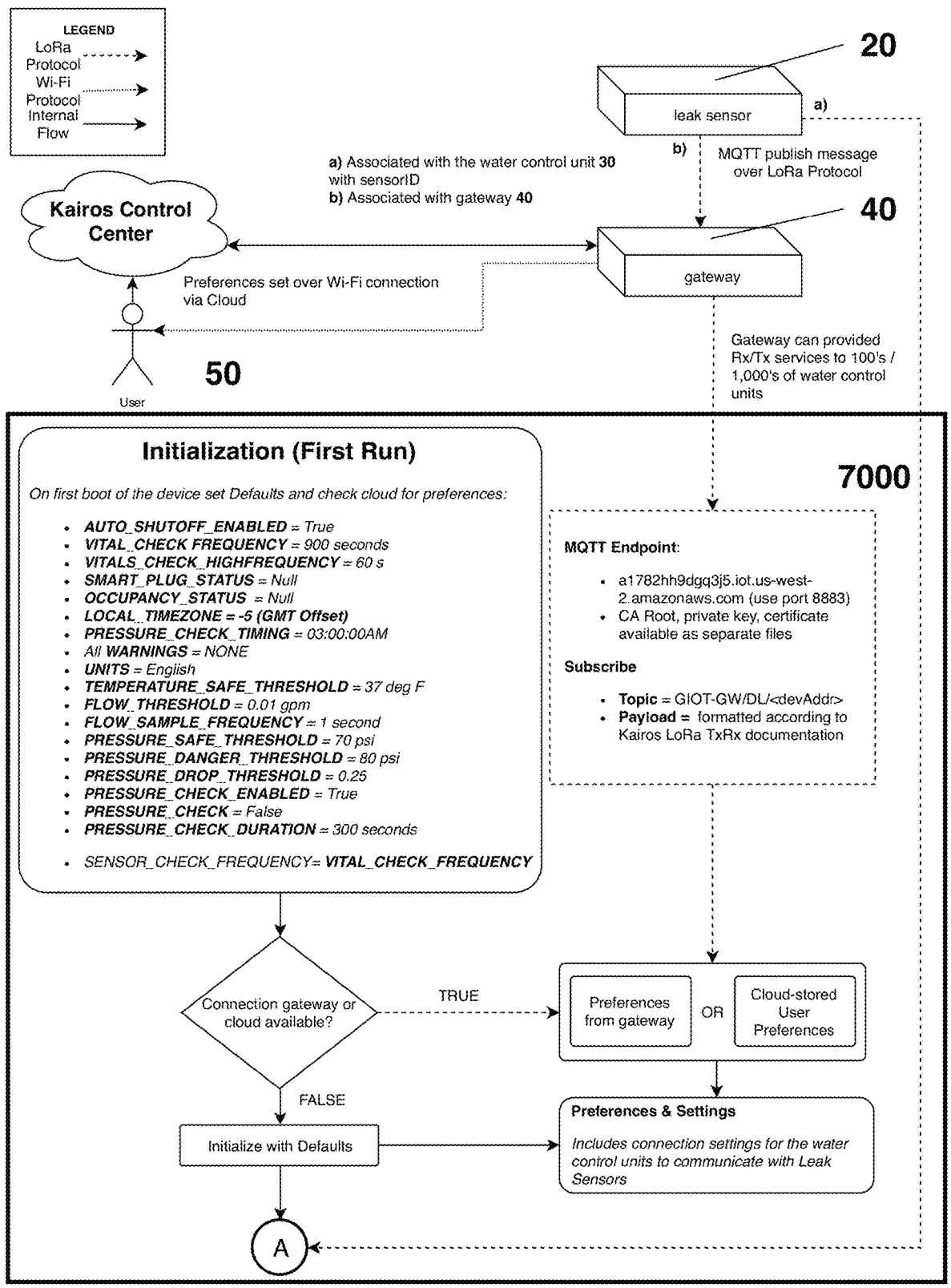
FIG. 7A-7H is a flow chart illustrating the operational logic flow of one embodiment of the fluid control system.
Figure 7B:
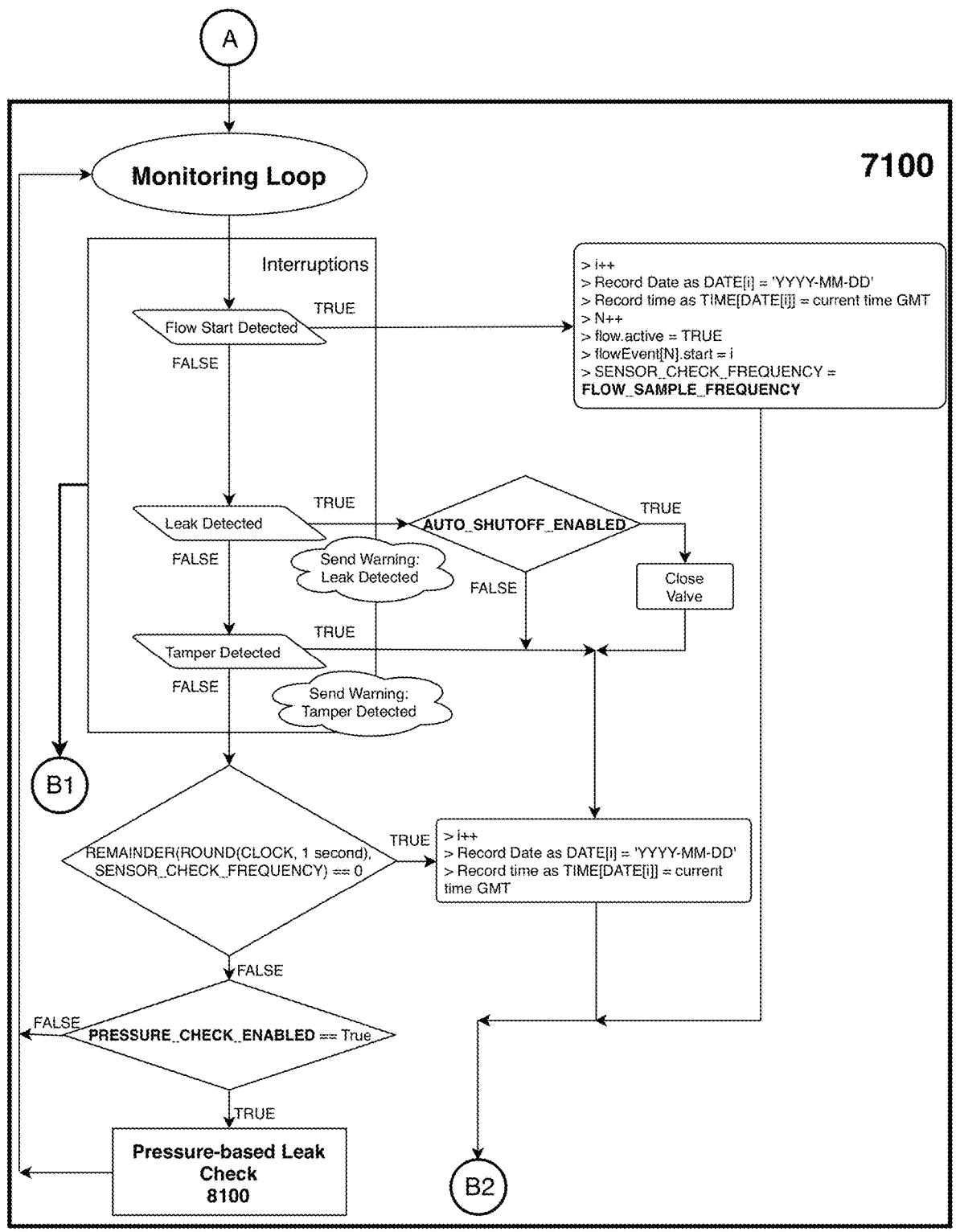
Figure 7C:
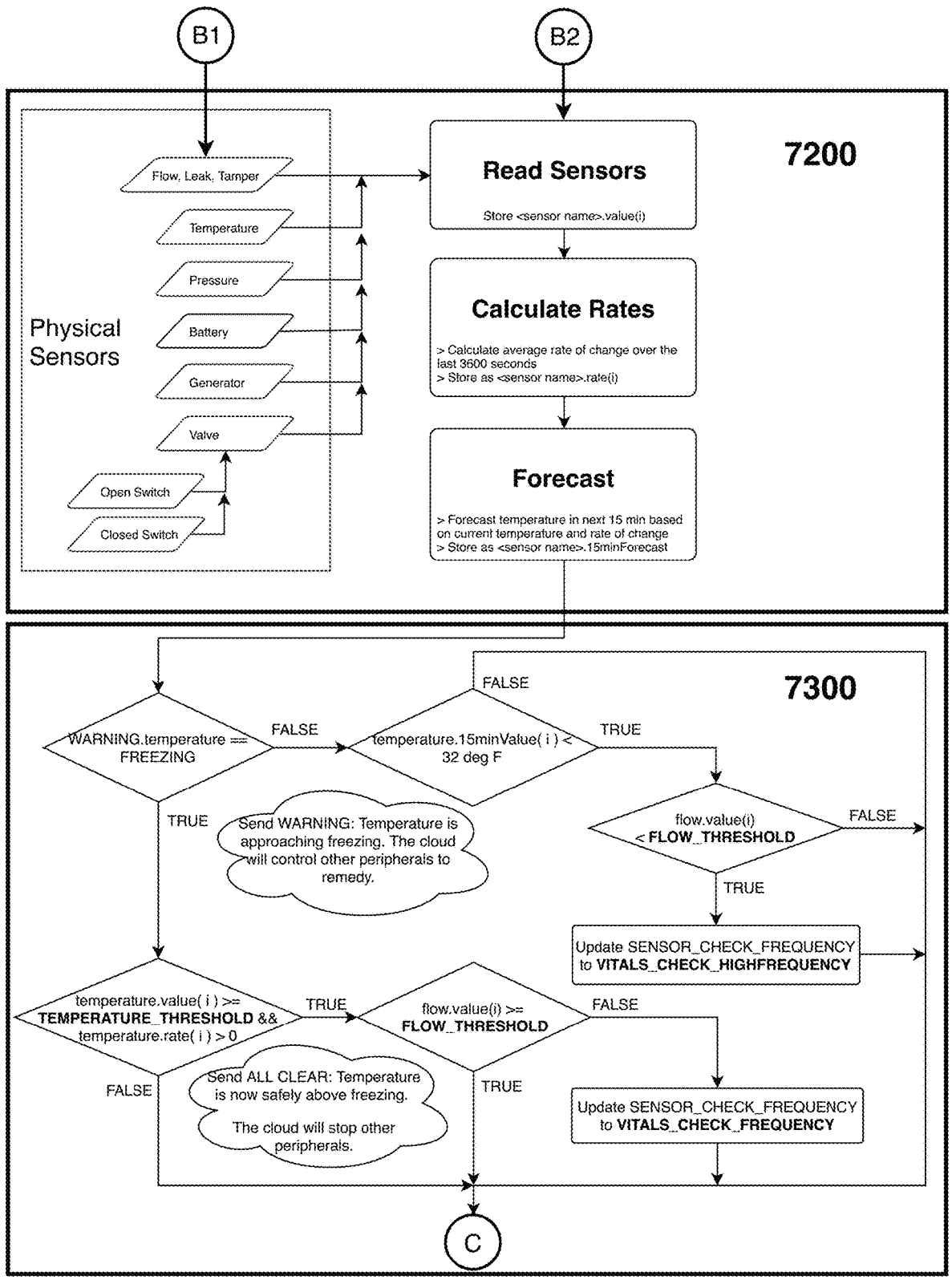
Figure 7D:
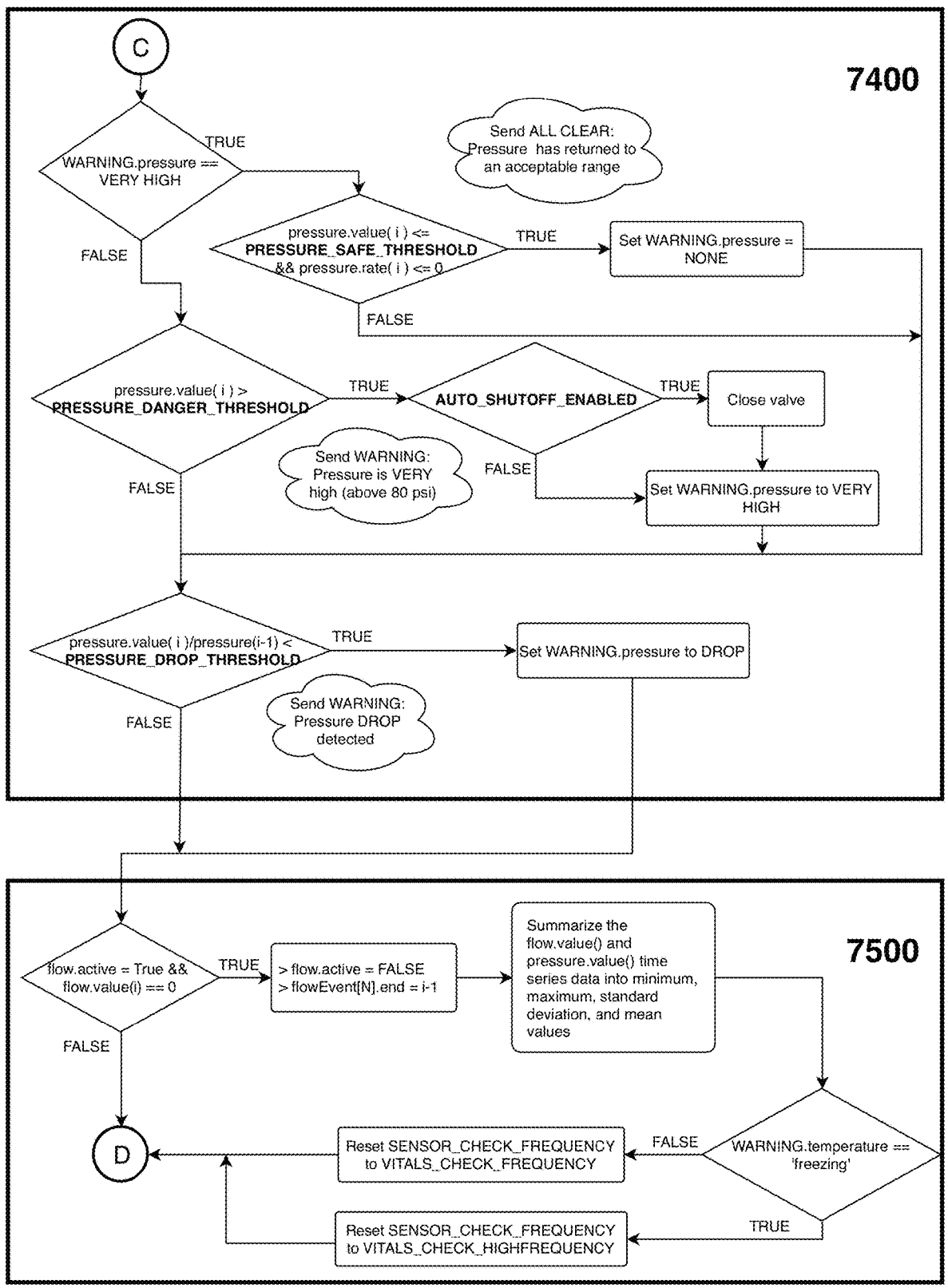
Figure 7E:
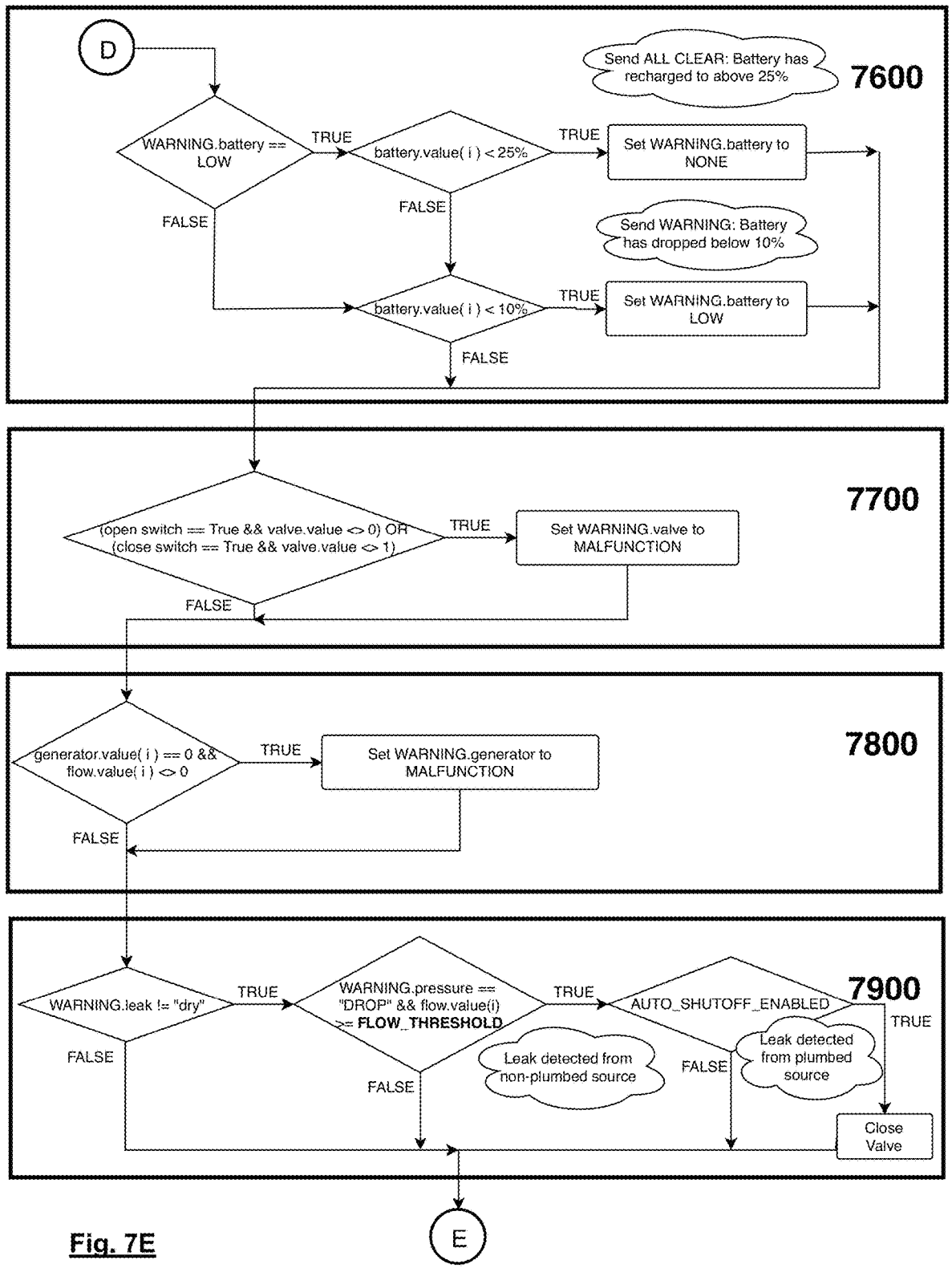
Figure 7F:
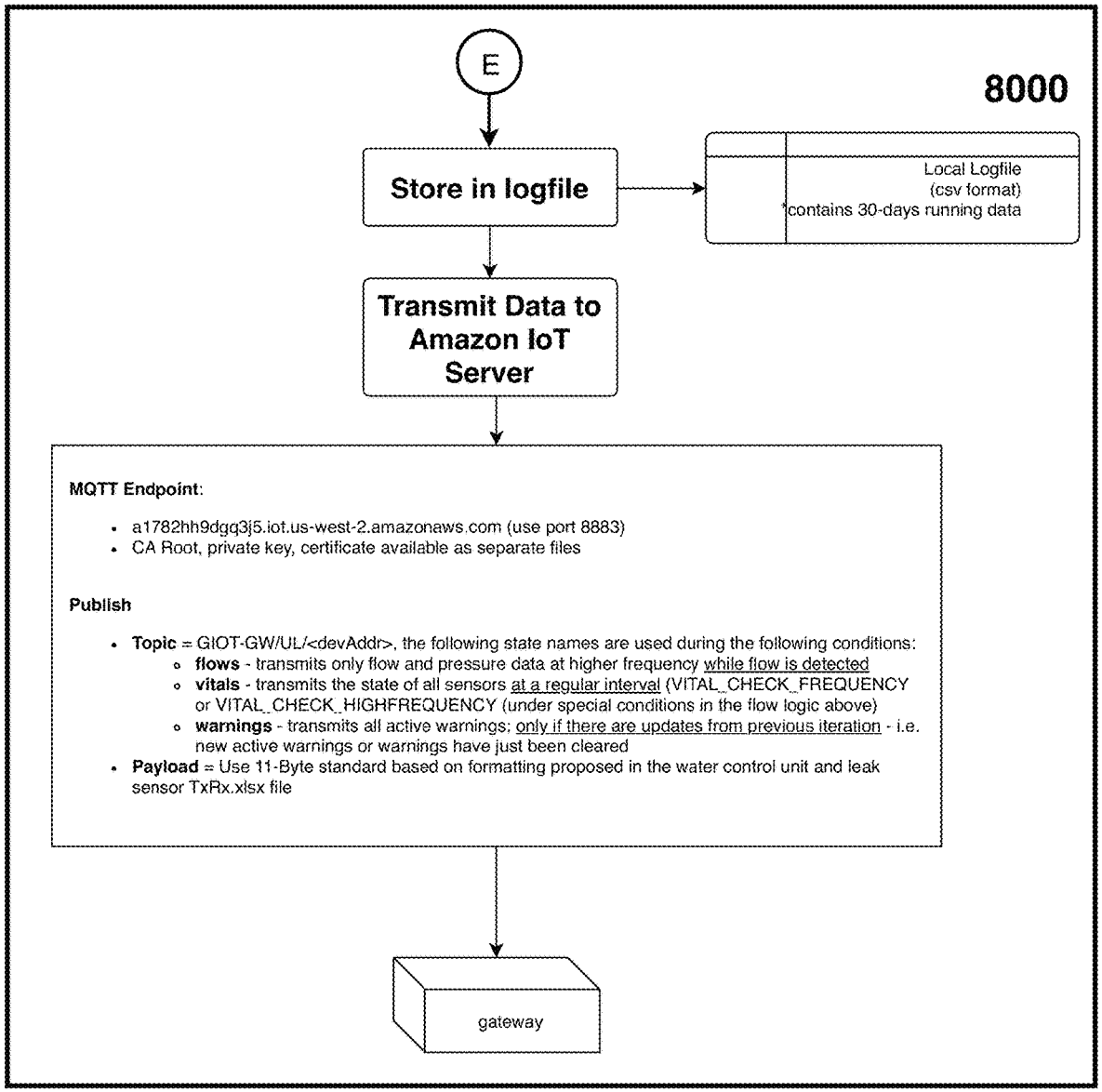
Figure 7G:
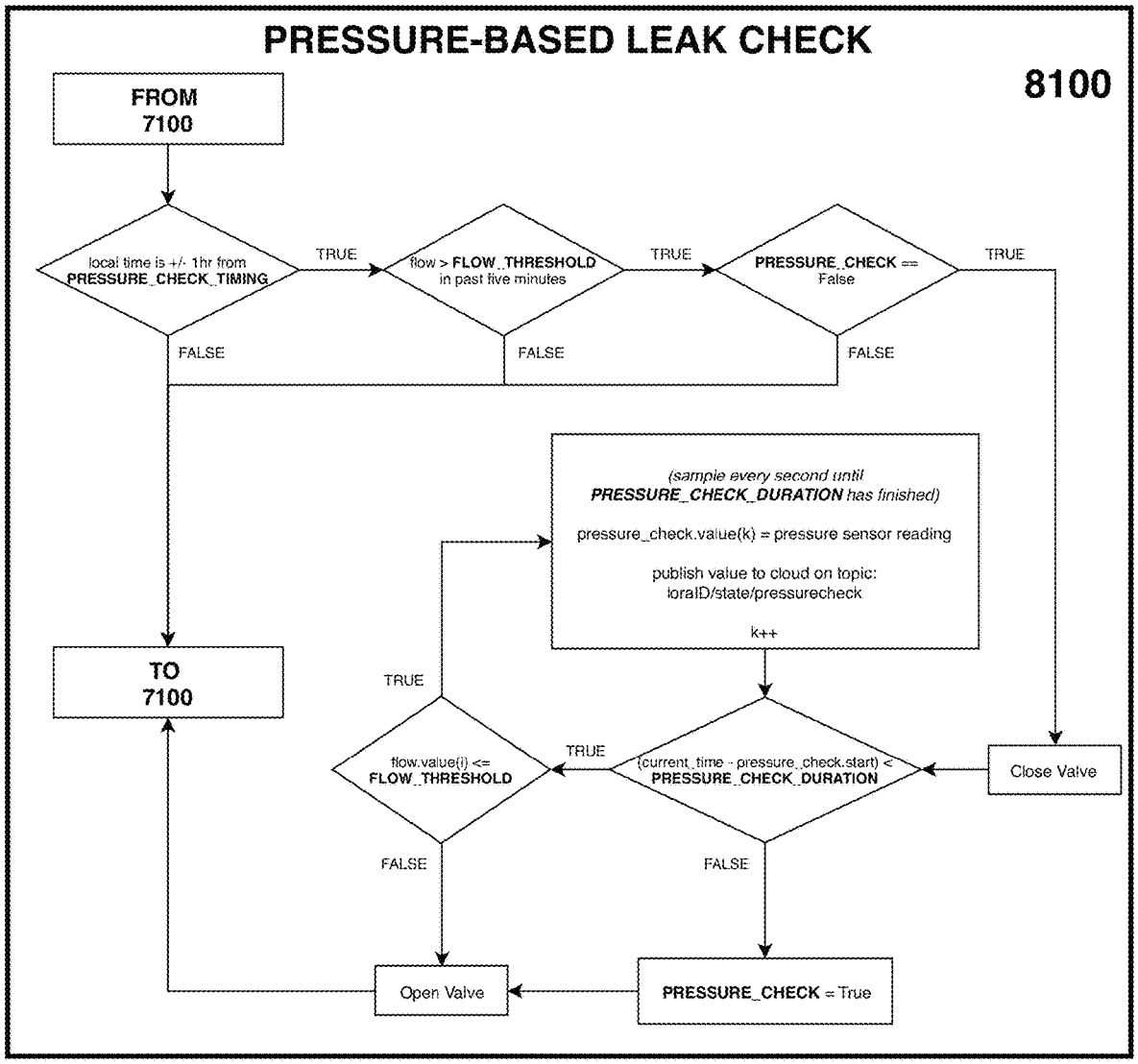
Figure 7H:
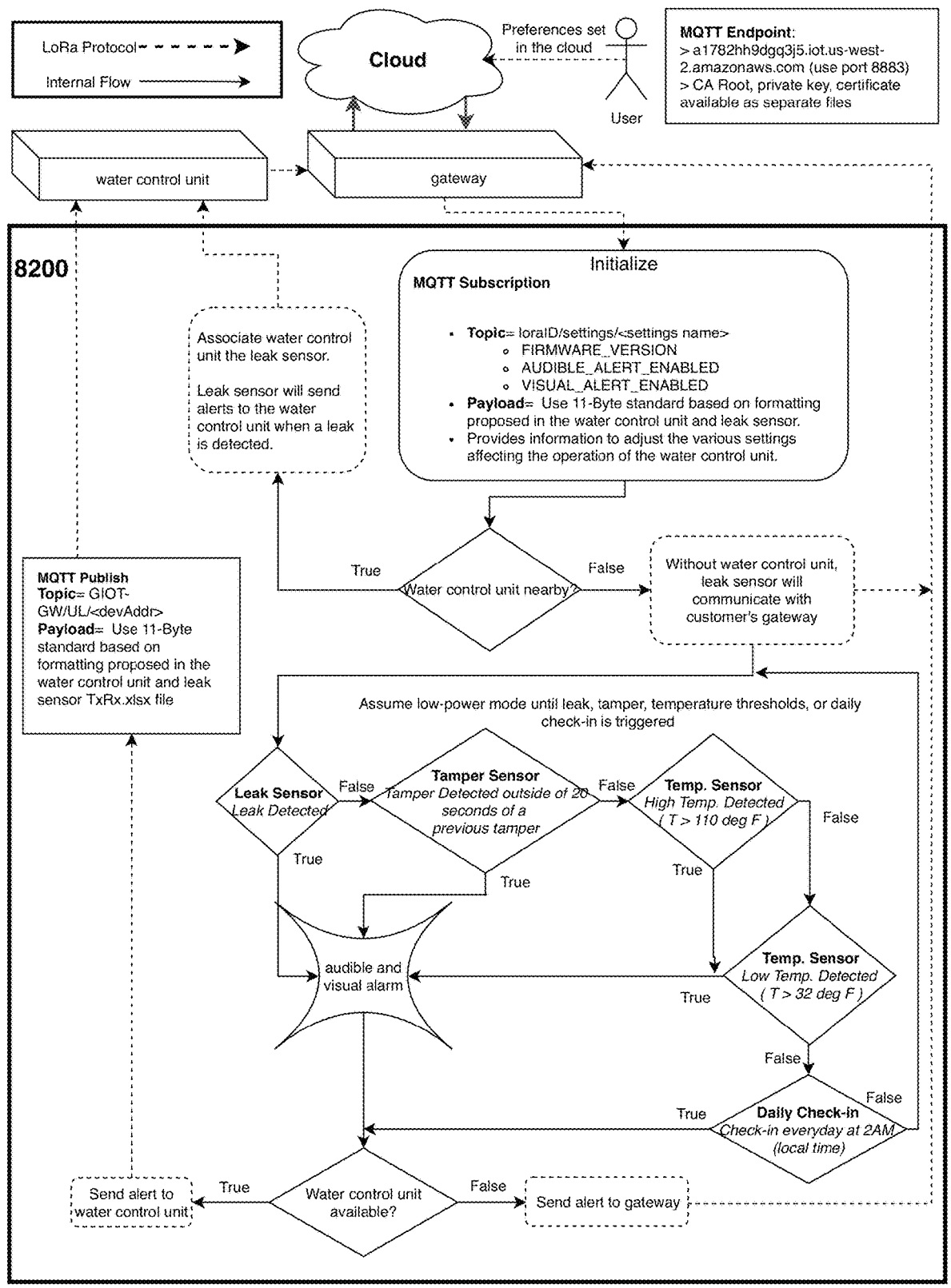

Ball valve assembly 304 also includes valve seats 3042a, 3042b. The material comprising the valve seats will depend upon the fluid application and can either be hard (e.g. ceramic, metal) or soft (e.g. elastomeric materials such as buna-N, polymers such as PTFE). As shown in FIG. 6H, the embodiments featuring the ball valve assembly 304, adapter 302 forms one side of the ball valve assembly and, as shown in FIG. 6A, extends outside the housing 301 providing a threaded adapter for attachment to a pre-existing supply line.

FIG. 7A-7H is a flow chart illustrating the logical steps in pseudocode according to one embodiment of the system. Box 7000 illustrates initialization of the system, using initial preferences set by the user using, e.g. a desktop or portable computer (including smart phones and tablet computing devices). These devices are connected using suitable Wi-Fi protocol to remote user application 50 for transmission to gateway 40, and via gateway 40, these initialization preferences are transmitted to leak sensor 20 using LoRa™ protocol. FIG. 7A-7H indicates that user preferences can be stored either remotely in the cloud, or at gateway 40, depending on the state of the communications network. Once these initial preferences are installed, operational onboard logic portion begins, which is shown beginning with "A" in FIG. 7A-7H. As shown in box 7100, the monitoring loop records three primary discrete events: flow start/stop, leak detection, and tamper detection. In one embodiment, the tamper sensor could be a SensorQuest SQ-SEN-200 Tilt & Vibration Sensor. The latter two events result in an event with a date/time stamp being recorded and warnings being sent. Moreover, depending on the configuration, an automatic shutoff signal may be sent to the water control device 30. If a pressure-based check is set during initialization, then the system executes this check according to the logic set forth in box 8100.

Even if one of the events above is not recorded, the system logic continuously monitors physical sensors, polling and recording data from these sensors periodically, calculating rates (e.g. flow rate) using this data, and forecasting values such as predicted temperature based on the calculated rates. These physical sensors include flow, leak, tamper, temperature, pressure, battery, generator output, valve status, as shown in box 7200. Box 7300 shows an example of the application of a forecast temperature. If the predicted temperature is below freezing, a warning can be sent alerting the user. During such a low temperature condition, the data sampling rate may increase automatically in response to a low-flow indication, where a freezing pipe may be the cause. In one embodiment, this temperature sensor could be a Vishay NTC thermistor (NTCLE100E3). At the end "C" of the temperature monitoring subroutine shown in box 7300, the system proceeds to the pressure monitoring subroutine shown in box 7400. If a very high pressure (e.g. 80 psi or greater) is detected, a warning message is sent. Conversely, if a very low pressure is detected, indicating a leak may be present, a warning is sent, and depending upon the initial system configuration and network communication status, a valve shutoff signal can be automatically sent to valve and actuator assembly 35. In one embodiment, this pressure sensor could be a Honeywell 3.3V low-power 150 psi range pressure sensor (HSCDANV150PGSB3).

The flow monitoring subroutine is shown in box 7500. In this subroutine, flow condition is monitored and the flow values, pressure values, and the associated time series data and statistical values such as minimum, maximum, standard deviation, and mean values are stored. The frequency of sensor data monitoring and recording is also adjusted based on, e.g. temperature values. This subroutine terminates at the beginning of the battery check subroutine shown in box 7600 in which the battery charge level is monitored. Alerts are generated with the battery charge level reaches predefined levels. As shown in boxes 7700 and 7800 the position of both the valve and actuator assembly 35 and the microturbine generator 36 are monitored and appropriate warnings are generated. Box 7900 shows a monitoring subroutine distinguishing between a leak from a plumbed, and a non-plumbed source. In the event of the former, and when auto-shutoff has been enabled, a signal is sent to valve and actuator assembly 35, commanding the valve to shut. This subroutine shows how information shared between leak sensor 20 and fluid control device 30 proves information to a user regarding how they are losing water. Because the logic distinguishes between leaks that are plumbed and non-plumbed, the water doesn't needlessly need to be shut-off if the leak from a leak sensor that monitors non-plumbed appliances/fixtures. All of the collected data from the foregoing subroutines is stored in a local logfile (i.e. at gateway 40), as well as at a cloud server if connectivity is available, as shown in box 8000. In one embodiment, this water flow meter could be measured by an Audiowell DN25 ultrasonic cold-water flow meter body using a Texas Instruments MSP430FR6047IPZR Ultrasonic MCU to read the signals picked up by the ultrasonic transducers in the meter body.

Box 8200 of FIG. 7A-7H illustrates the communication networking logic of one embodiment of leak sensor 20. After initialization, leak sensor 20 scans for a signal from fluid control device 30 to determine whether the unit is nearby. If it is, leak sensor 20 will send alerts directly to the fluid control device 30 when a leak is detected, allowing for automatic water shutoff to mitigate a leak. Otherwise, leak sensor 20 will communicate directly with gateway 40, which in turn communicates with the end user via remote user application 50. In one embodiment, the LoRa communication radio could be Gemtek's GIOT G76 SiP modules.

Figure 8A:
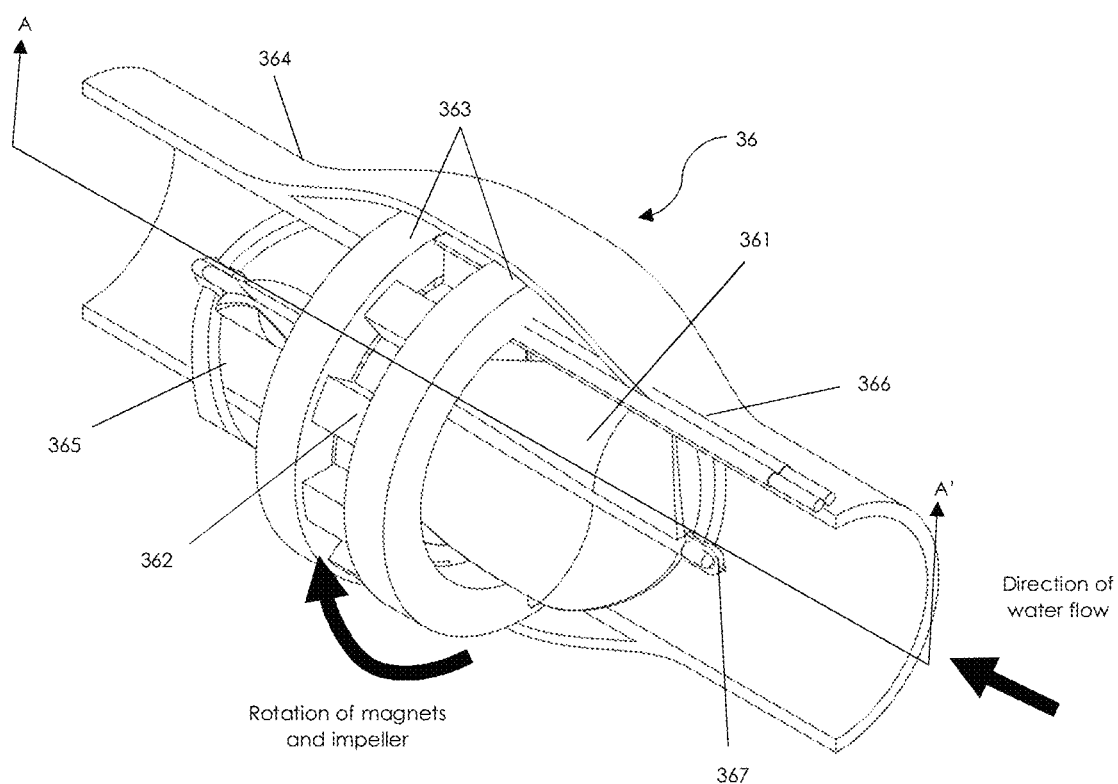
FIG. 8A is an isometric cutaway drawing of one embodiment of the microturbine.
Figure 8B:
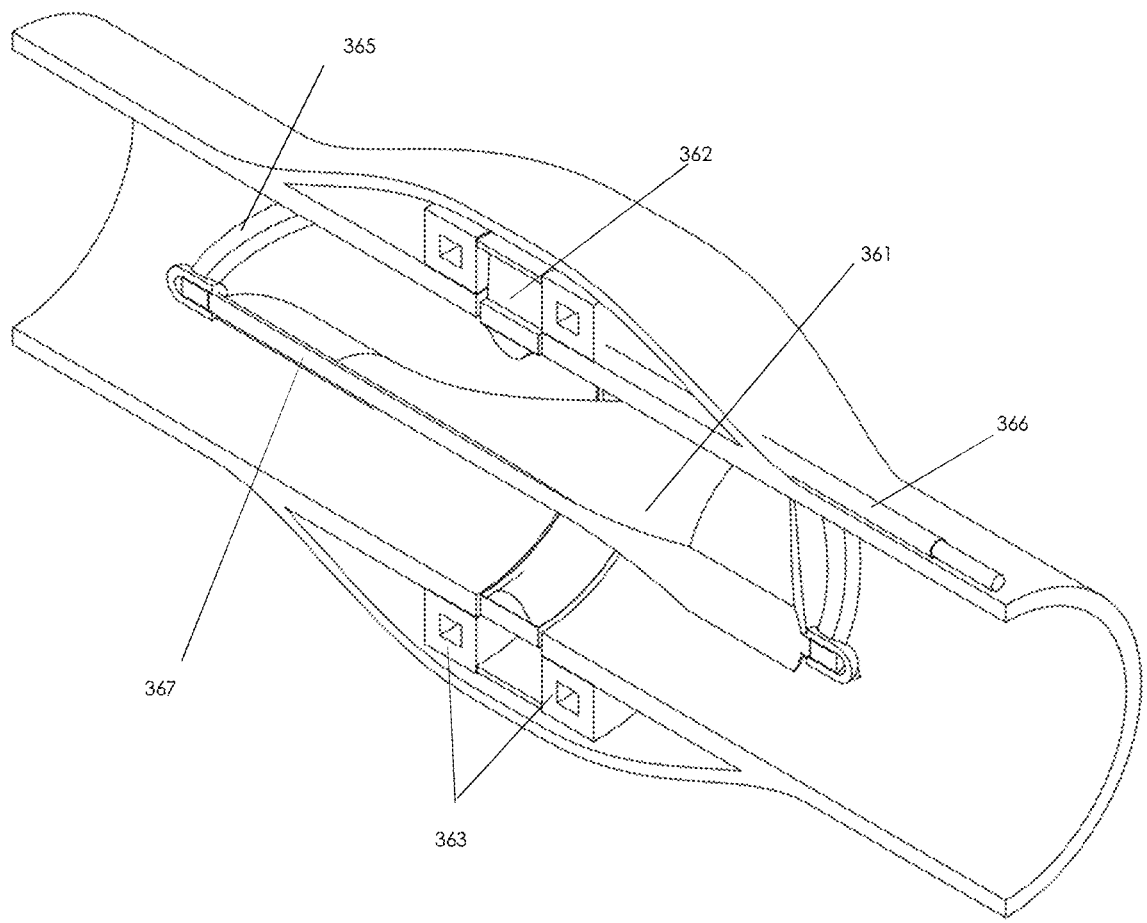
FIG. 8B shows a cross-sectional isometric view through section A-A' of the embodiment shown in FIG. 8A.

The interior structure of one embodiment of microturbine generator 36 is shown in FIGS. 8A-8B. Microturbine generator 36 allows the fluid control device to generate its own power, i.e. it does not require an external power connection, and is connected to power supply 32. It captures energy from water flowing into a structure using an impeller 361, induction magnets 362, and induction coils 363. In the embodiments consisting of an onboard rechargeable battery bank, microturbine generator 36 provides a means to keep the batteries charged at all times. Microturbine generator 36 in typical embodiments is comprised of impeller 361 surrounded by induction magnets 362 and induction coils 363 arranged in a ring configuration inside housing 364. As the impeller rotates due to water flowing through piping segment 310 from municipal water pressure, the ring of induction magnets 362, which is attached to the impeller also rotates with it. On either side of the induction magnets are induction coils 363 wound into rings. These coils are wrapped around an iron core. The magnets driven by water rotating impeller 361 pass by the coils, thereby inducing an electromotive force in power leads 366 that are connected to a rechargeable battery bank in power supply 32. The impeller itself is supported within the center of the pipe by struts 365 attached to the walls of the housing 364. FIG. 8B is a cutaway view along section A-A' from FIG. 8A, in which the struts 365 supporting shaft 367 using a bearing ring contained within struts 365 can clearly be seen.

All of the embodiments set forth herein are illustrative only of the inventive concept represented by the claims and should not be construed to limit the scope of the invention as set forth in the claims. Other aspects, advantages, modifications, and combinations will be apparent to those skilled in the art to which the invention pertains, and these aspects and modifications are within the scope of the invention, which is limited only by the appended claims. Although examples of specific components and configurations have been presented in the embodiments herein, the invention is not limited to such materials or dimensions unless specifically required by the language of a claim. The components and configurations presented in the embodiments herein can be rearranged and combined in manners other than as specifically described above, with all alternative permutations and combinations remaining within the scope of the invention as defined by the claims.

The invention claimed is:

1. A leak detection system, comprising:
a waterproof membrane;
at least one electrical circuit affixed to an underside of the waterproof membrane comprising an anode and a cathode separated by a gap,
a plurality of perforations through the waterproof membrane superimposed upon the gap;
a leak sensor coupled to the at least one electrical circuit comprising:
a first microcontroller adapted to generate a first signal when the at least one electrical circuit is closed; and
a transceiver adapted to communicate with a gateway;
a remote user application;
a plurality of sensors adapted to measure properties of a liquid; and
a second microcontroller adapted to (i) receive sensor data generated by the plurality of sensors, and (ii) encode a sensor data set comprising one or more measured parameters from sensor data generated by the plurality of sensors.

2. The leak detection system of claim 1, further comprising:
a fluid control device comprising a transceiver, wherein the transceiver is adapted to receive the first signal from the leak sensor via the gateway.

3. The leak detection system of claim 2, wherein the fluid control device is adapted to interrupt flow of a liquid through a conduit upon receipt of the first signal.

4. The leak detection system of claim 2, wherein the fluid control device comprises a valve, wherein the valve is adapted to move from a first position to a second position when the fluid control device receives a second signal generated by the remote user application.

5. The leak detection system of claim 1, wherein the remote user application is adapted to generate a third signal based on the sensor data set, wherein the third signal is generated when the sensor data set contains values meeting parameters defined via the remote user application.

6. The leak detection system of claim 1, wherein the plurality of sensors comprises an ultrasonic flow sensor.

7. The leak detection system of claim 1, wherein the plurality of sensors further comprises a pressure sensor and a temperature sensor.

8. The leak detection system of claim 3, wherein the fluid control device comprises a valve, wherein the valve is adapted to move from an open position to a closed position when the fluid control device receives the first signal.

9. The leak detection system of claim 1, wherein the leak sensor further comprises an audible alarm activated by the first signal.

10. The leak detection system of claim 9, wherein the leak sensor further comprises a tilt switch adapted to generate a fourth signal, wherein the audible alarm is activated by the fourth signal.

* * * * *